United States Patent
Ishikawa et al.

(10) Patent No.: US 9,836,051 B2
(45) Date of Patent: Dec. 5, 2017

(54) AUTOMATED DRIVE ASSISTING DEVICE, AUTOMATED DRIVE ASSISTING METHOD, AND PROGRAM

(71) Applicant: AISIN AW CO., LTD., Anjo-shi, Aichi-ken (JP)

(72) Inventors: Ken Ishikawa, Nagoya (JP); Yuji Sato, Owariasahi (JP); Masaki Nakamura, Okazaki (JP); Takayuki Miyajima, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 15/108,179

(22) PCT Filed: Jan. 13, 2015

(86) PCT No.: PCT/JP2015/050587
§ 371 (c)(1),
(2) Date: Jun. 24, 2016

(87) PCT Pub. No.: WO2015/115159
PCT Pub. Date: Aug. 6, 2015

(65) Prior Publication Data
US 2016/0327947 A1 Nov. 10, 2016

(30) Foreign Application Priority Data

Jan. 29, 2014 (JP) .................................. 2014-014673

(51) Int. Cl.
*G05D 1/00* (2006.01)
*B60W 30/12* (2006.01)
(Continued)

(52) U.S. Cl.
CPC ........... *G05D 1/0061* (2013.01); *B60W 30/12* (2013.01); *B60W 50/08* (2013.01); *B60W 50/14* (2013.01);
(Continued)

(58) Field of Classification Search
CPC ...... G05D 1/0061; G05D 1/021; G05D 1/167; B60W 50/08; B60W 50/14; B60W 30/12;
(Continued)

(56) References Cited

U.S. PATENT DOCUMENTS 5,765,116 A * 6/1998 Wilson-Jones ...... G05D 1/0246
180/168
6,226,592 B1 * 5/2001 Luckscheiter ....... B62D 15/025
180/411
(Continued)

FOREIGN PATENT DOCUMENTS

CN 103386975 A 11/2013
JP H05-40898 2/1993
(Continued)

*Primary Examiner* — Jelani A Smith
*Assistant Examiner* — James E Stroud
(74) *Attorney, Agent, or Firm* — Oliff PLC

(57) ABSTRACT

Automated drive assisting devices, methods, and programs acquire position specifying information for specifying a vehicle position during travel, and acquire a continuity degree that represents a degree to which automated drive can be continued on the basis of the position specifying information acquired during the automated drive. The devices, methods, and programs determine whether the automated drive can be continued on the basis of the acquired continuity degree, and determine vehicle control information for controlling a vehicle such that the continuity degree becomes higher on the basis of the acquired position specifying information in the case where it is determined that the automated drive cannot be continued. The devices, methods, and programs output the determined vehicle control information to a vehicle control device that controls the vehicle.

8 Claims, 10 Drawing Sheets

(51) Int. Cl.
*B60W 50/08* (2012.01)
*G08G 1/16* (2006.01)
*B60W 50/14* (2012.01)
*G05D 1/02* (2006.01)
*B60W 30/16* (2012.01)
*G01C 21/36* (2006.01)

(52) U.S. Cl.
CPC ............ *G05D 1/021* (2013.01); *G08G 1/167* (2013.01); *B60W 30/16* (2013.01); *B60W 2550/141* (2013.01); *B60W 2550/146* (2013.01); *B60W 2550/302* (2013.01); *B60W 2550/306* (2013.01); *B60W 2550/308* (2013.01); *G01C 21/3629* (2013.01); *G01C 21/3697* (2013.01)

(58) Field of Classification Search
CPC ........... B60W 30/16; B60W 2550/141; B60W 2550/146; B60W 2550/302; B60W 2550/306; B60W 2550/308; G01C 21/3629; G01C 21/3697
USPC .......................................................... 701/23
See application file for complete search history.

(56) References Cited

U.S. PATENT DOCUMENTS

| | | | | |
|---|---|---|---|---|
| 9,286,800 | B2* | 3/2016 | Gordon | ................... G08G 1/09 |
| 2002/0040265 | A1* | 4/2002 | Sadano | ............... B62D 5/0463 |
| | | | | 701/41 |
| 2002/0184236 | A1* | 12/2002 | Donath | .................... B60R 1/00 |
| 2005/0149251 | A1* | 7/2005 | Donath | .................. G01C 21/26 |
| | | | | 701/532 |
| 2009/0088925 | A1* | 4/2009 | Sugawara | ............ B60W 30/12 |
| | | | | 701/41 |

FOREIGN PATENT DOCUMENTS

| | | |
|---|---|---|
| JP | 2001-023094 A | 1/2001 |
| JP | 2004-126888 A | 4/2004 |
| JP | 2004-206275 A | 7/2004 |
| JP | 2007-003287 A | 1/2007 |
| JP | 2008-077172 A | 4/2008 |
| JP | 2012-221291 A | 11/2012 |

\* cited by examiner

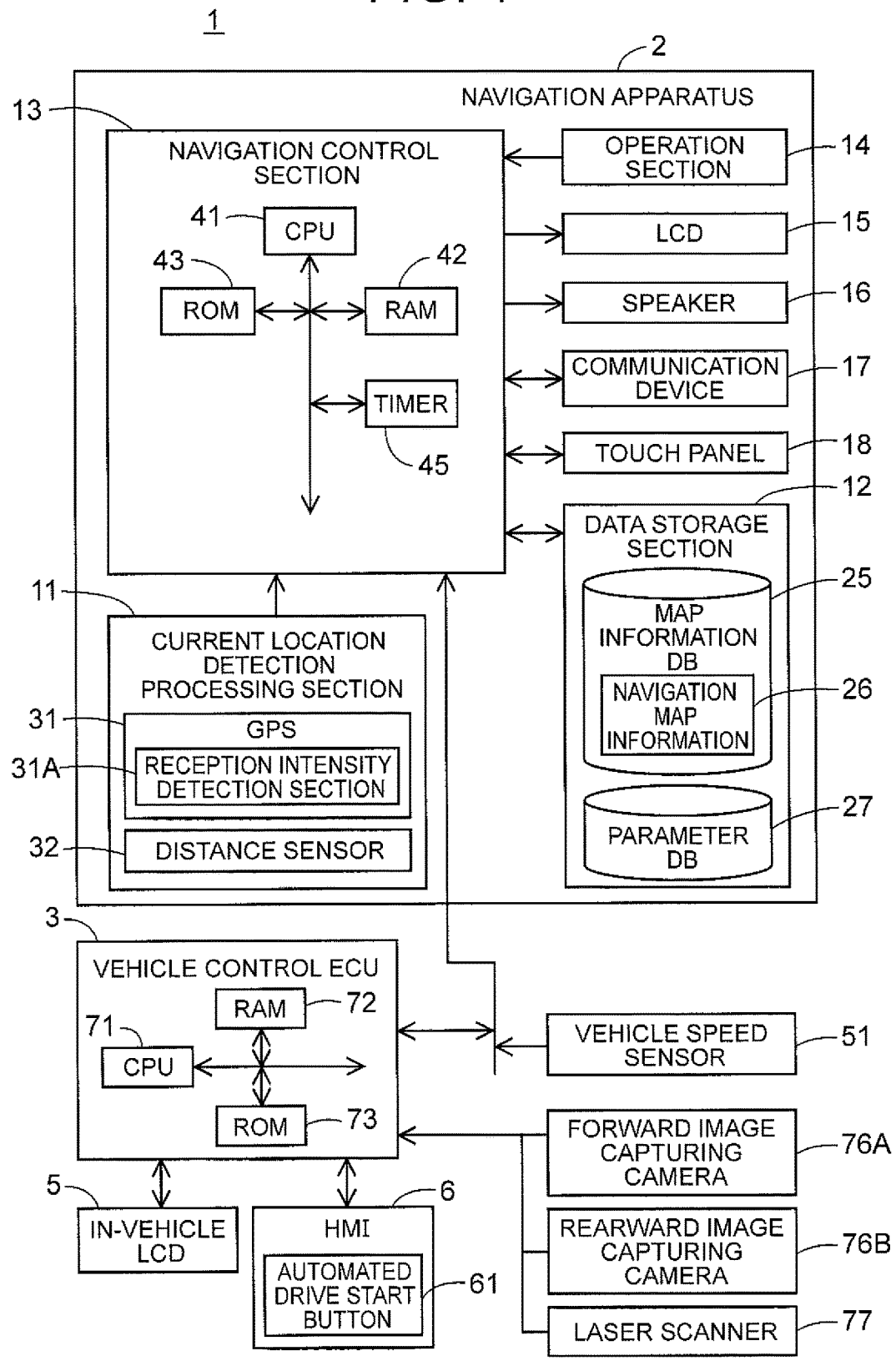

FIG. 2

| VEHICLE POSITION SPECIFYING METHOD | AFFECTING PARAMETER | VEHICLE POSITION CONFIDENCE DEGREE | | CO-EFFICIENT |
|---|---|---|---|---|
| | | HIGH | LOW | |
| IMAGE RECOGNITION | HOW BOUNDARY LINE LOOKS (HOW EDGE IS DETECTED) | BOUNDARY LINE IS NOT FADED | BOUNDARY LINE IS FADED | A |
| SURROUNDING FEATURE RECOGNITION | DENSITY AND DISTRIBUTION STATUS OF SPACE CHARACTERISTIC POINTS | CONTINUOUS DENSE GROUP OF POINTS HAS BEEN ACQUIRED | • DENSITY OF POINT GROUP IS LOW<br>• POINT GROUP IS NOT CONTINUOUS<br>ETC. | B |
| GPS RECEPTION | GPS RECEPTION INTENSITY | VEHICLE IS NOT SURROUNDED BY TALL BUILDINGS | VEHICLE IS SURROUNDED BY TALL BUILDINGS | C |

28

IN CASE OF IMAGE RECOGNITION FACTOR

IN CASE OF SURROUNDING FEATURE RECOGNITION FACTOR

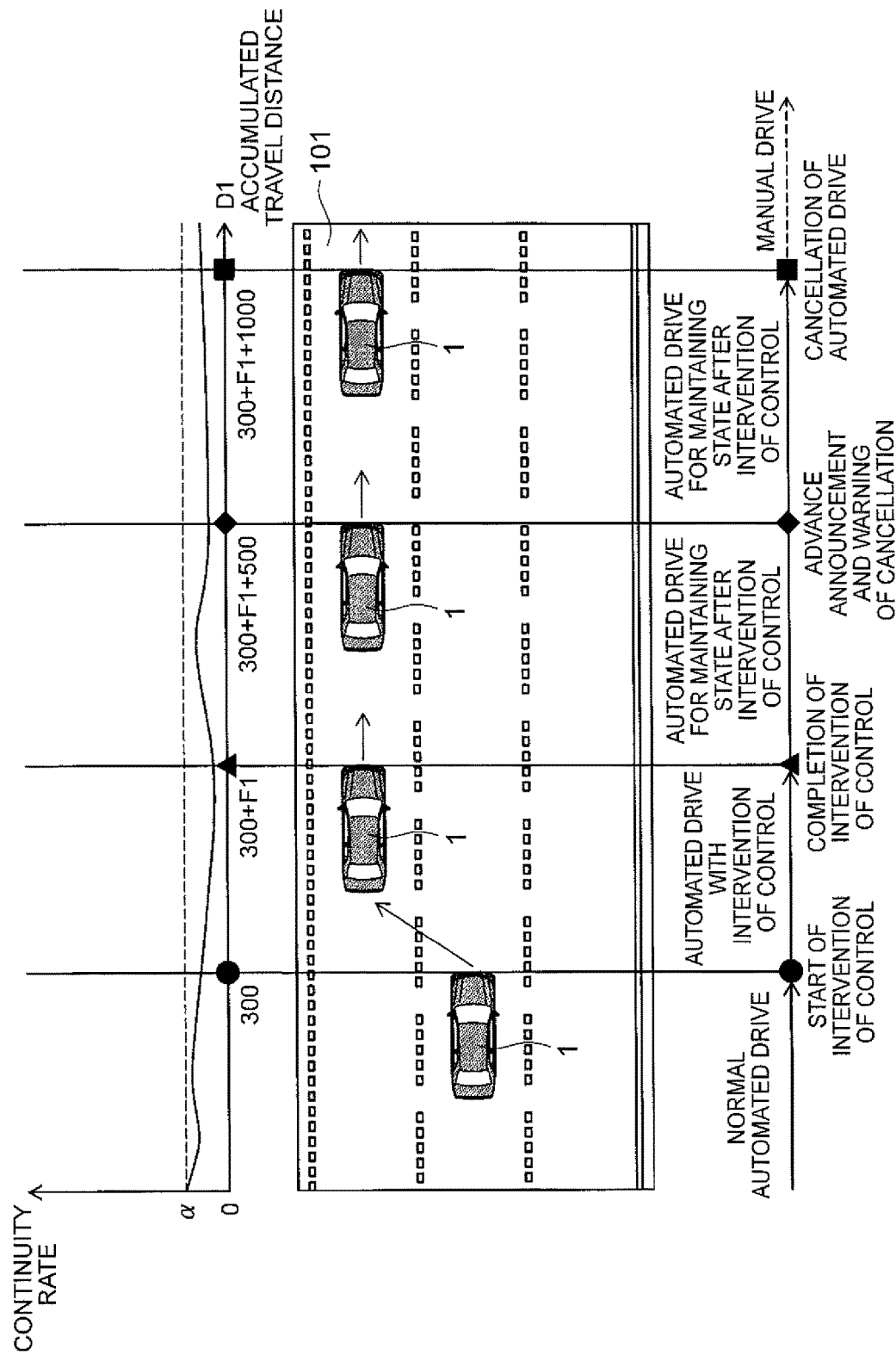

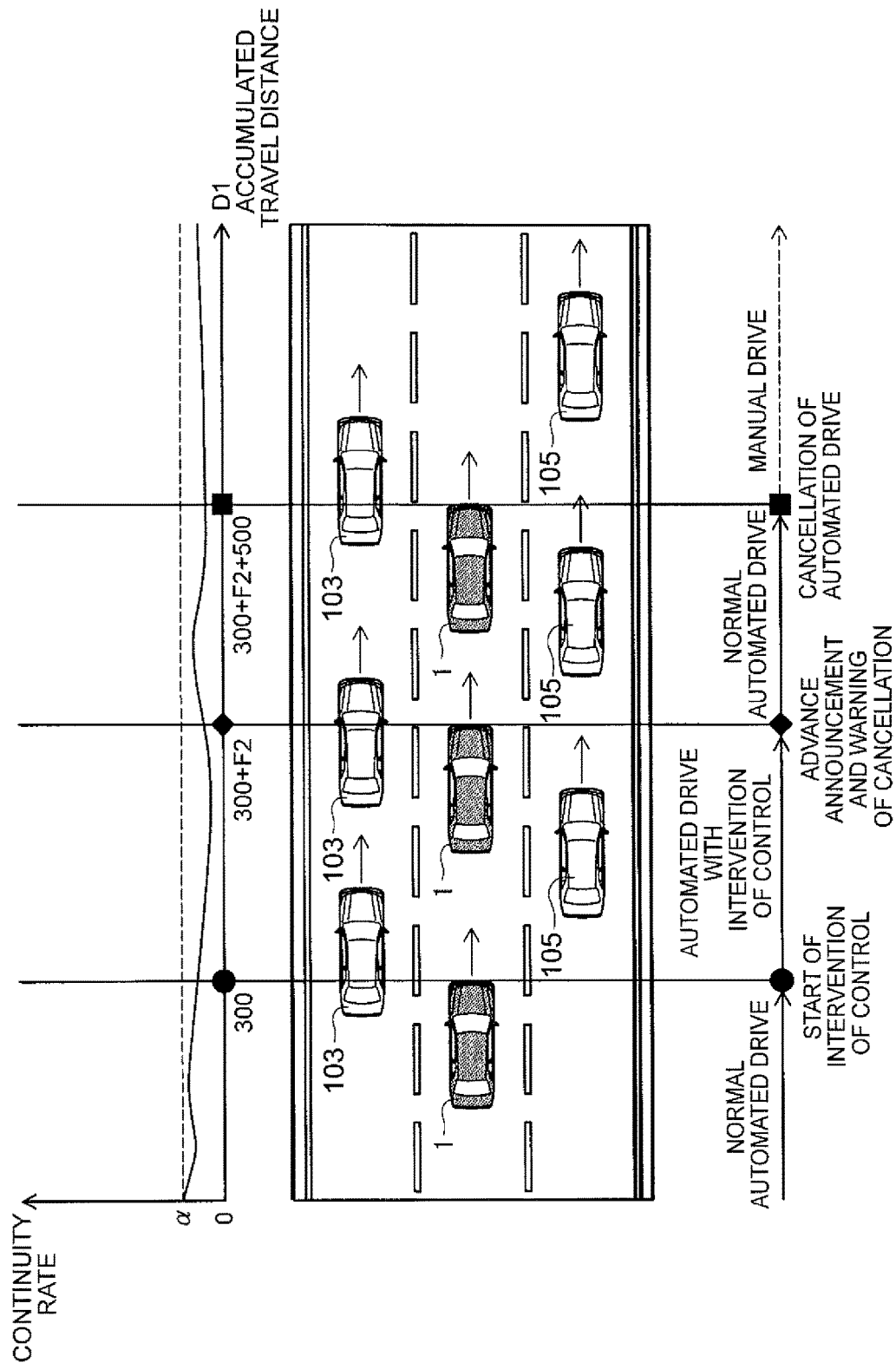

AUTOMATED DRIVE ASSISTING DEVICE, AUTOMATED DRIVE ASSISTING METHOD, AND PROGRAM

TECHNICAL FIELD

Related technical fields include automated drive assisting devices, methods, and programs that assist automated drive.

BACKGROUND ART

A variety of technologies for assisting automated drive have been proposed conventionally.

For example, a vehicle information presentation apparatus disclosed in Japanese Patent Application Publication No. 2004-126888 (JP 2004-126888 A) includes a lane keep control device that captures a scene ahead of a vehicle using a capturing device and that performs image processing on the captured image to recognize the vehicle position with respect to the white line position on a road. The lane keep control device also controls a steering operation device so as to keep the vehicle position within a lane. Meanwhile, in the case where a control disabled location at which control by the lane keep control device is disabled has been registered within a prescribed distance from the vehicle, an information presentation control section notifies a driver of the control disabled location to encourage drive that does not rely on the lane keep control device.

Meanwhile, a semi-automated drive system disclosed in Japanese Patent Application Publication No. 2001-023094 (JP 2001-023094 A), for example, includes a lane-maintaining travel control section that detects the white line position on a road from an image captured by a camera and that automatically controls the travel direction such that the vehicle travels along the white line. In the case where the white line position cannot be detected, the lane-maintaining travel control section stops lane-maintaining travel, and outputs a stop signal to an informing control section. In the case where a stop signal is input, the informing control section informs a driver that lane-maintaining travel has been stopped.

SUMMARY

In the vehicle information presentation apparatus described in JP 2004-126888 A and the semi-automated drive system described in JP 2001-023094 A, however, automated drive may be canceled after the driver is warned even in the case where automated drive can be continued by detecting the white line position on the road by changing the travel position by changing the travel lane or the like.

Exemplary embodiments of the broad inventive principles described herein provide an automated drive assisting device, an automated drive assisting method, and a program that can control a vehicle so as to suppress cancellation of automated drive.

In order to achieve the foregoing object, exemplary embodiments provide an automated drive assisting device that outputs vehicle control information to a vehicle control device that controls a vehicle, an automated drive assisting method in which the automated drive assisting device is used, and a program that allows the automated drive assisting device to implement the following functions. Specifically, the device, method, and program specify a vehicle position during travel; acquire a continuity degree that represents a degree to which automated drive can be continued on the basis of the position specifying information during automated drive; determine whether or not automated drive can be continued on the basis of the acquired continuity degree; decide vehicle control information for controlling a vehicle such that the continuity degree becomes higher on the basis of the position specifying information in the case where it is determined that automated drive cannot be continued; and output the vehicle control information to a vehicle control device that controls the vehicle.

In the automated drive assisting device, the automated drive assisting method, and the program configured as described above, in the case where it is determined that the continuity degree which is acquired on the basis of the position specifying information for specifying the vehicle position during automated drive is low and automated drive cannot be continued, the vehicle control information for controlling the vehicle such that the continuity degree becomes higher can be decided on the basis of the position specifying information, and output to the vehicle control device. As a result, the vehicle control device can perform control so as to possibly enhance the continuity degree by controlling the vehicle on the basis of the input vehicle control information, which can control the vehicle so as to suppress cancellation of automated drive.

BRIEF DESCRIPTION OF THE DRAWINGS

FIG. 1 is a block diagram illustrating an example of the configuration of a vehicle.

FIG. 2 illustrates an example of a confidence degree data table stored in a parameter DB.

FIG. 10 illustrates an example of cancellation of automated drive for a case where a lane change is made.

FIG. 11 illustrates an example of cancellation of automated drive for a case where a lane change cannot be made according to another embodiment.

DETAILED DESCRIPTION OF EXEMPLARY EMBODIMENTS

Figure 3:
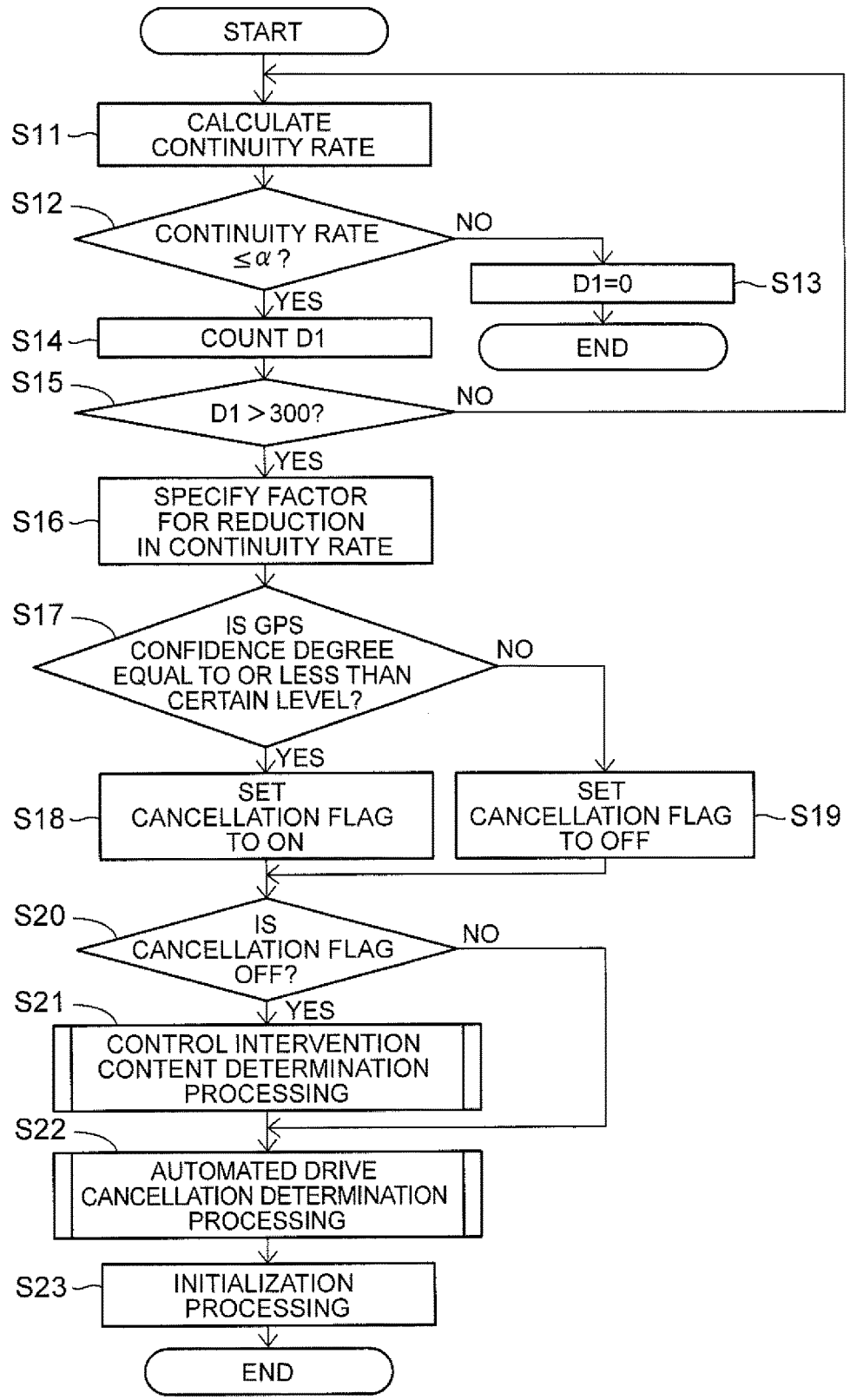
FIG. 3 is a main flowchart illustrating "automated drive cancellation processing" executed in a navigation apparatus.

An automated drive assisting device, an automated drive assisting method, and a program, embodied as a navigation apparatus, according to an embodiment will be described in detail below with reference to the drawings.

[Schematic Configuration of Vehicle]

A schematic configuration of a vehicle 1 according to the embodiment will be described with reference to FIG. 1. As illustrated in FIG. 1, the vehicle 1 according to the embodiment is basically composed of a navigation apparatus 2 installed in the vehicle 1 and a vehicle control ECU (electronic control unit) 3.

The navigation apparatus 2 is provided in the center console or a panel surface in the cabin of the vehicle 1, and includes a liquid crystal display (LCD) 15 that displays a map of an area around the vehicle and a route to a destination location, a speaker 16 that outputs audio guidance about route guidance, and so forth. The navigation apparatus 2 specifies the current position of the vehicle 1 through a GPS 31 etc., and in the case where a destination location is set, searches for a plurality of routes to the destination location and provides guidance on the set route for guidance using the liquid crystal display 15 and the speaker 16. The configuration of the navigation apparatus 2 will be discussed in detail later.

The vehicle control ECU 3 is an electronic control unit that controls the entire vehicle 1, and functions as an example of a vehicle control device. In addition, a navigation control section 13 of the navigation apparatus 2 to be discussed later is connected to the vehicle control ECU 3. In addition, an in-vehicle display (in-vehicle LCD) 5 that displays a speedometer etc., a human interface (HMI) 6, a forward image capturing camera 76A, a rearward image capturing camera 76B, a laser scanner 77, a vehicle speed sensor 51 that detects the vehicle speed, and so forth are connected to the vehicle control ECU 3.

The vehicle control ECU 3 includes a CPU 71 that serves as a computation device and a control device, and internal storage media such as a RAM 72 for use as a working memory when the CPU 71 performs various types of computation processing and a ROM 73 that stores a control program etc. (As used herein the terms "storage media" and "storage medium" are not intended to encompass transitory signals.) The CPU 71 prepares a drive plan on the basis of route data on a route for guidance received from the navigation control section 13 of the navigation apparatus 2, gradient information on each link on the route, link length, and so forth.

The human interface 6 is provided with an automated drive start button 61 for instructing start of automated drive etc. A driver can instruct the vehicle control ECU 3 to start automated drive by depressing the automated drive start button 61 on a toll road such as a national express highway, an urban expressway, and an ordinary toll road.

In the case where an instruction to start automated drive is input, the CPU 71 sets an interruption timing, at which switching is made from automated drive to manual drive by the driver, at an access road (ramp way) at the exit of the toll road, a toll gate (interchange), or the like on the route for guidance on the basis of the drive plan. For example, the CPU 71 sets an interruption timing at a position 500 m before the exit of the toll road. The CPU 71 controls drive of an engine device, a brake device, an electric power steering system, and so forth (not illustrated) to perform automated drive until the interruption timing on the route for guidance is reached.

The forward image capturing camera 76A is attached near the rearview mirror of the vehicle 1, constituted of a CCD camera or the like, and captures an image of a scene ahead of the vehicle and outputs an image signal to the vehicle control ECU 3. The rearward image capturing camera 76B is attached at the rear end portion of the vehicle 1, constituted of a CCD camera or the like, and captures an image of a scene behind the vehicle and outputs an image signal to the vehicle control ECU 3. The CPU 71 performs image processing on the image signal input from the forward image capturing camera 76A to recognize images of while lines that indicate the boundary of the travel lane (e.g. a side strip, a lane boundary line, or the like) through edge detection or the like.

The CPU 71 controls drive of the engine device, the brake device, the electric power steering system, and so forth (not illustrated) such that the vehicle 1 travels along the white lines. In addition, the CPU 71 outputs image recognition data on the white lines to the navigation apparatus 2. In addition, the CPU 71 performs image processing on the image signals input from the forward image capturing camera 76A and the rearward image capturing camera 76B to detect inter-vehicle distances from other vehicles that are present ahead of and behind the vehicle 1, and outputs the detected inter-vehicle distances to the navigation apparatus 2. In addition, the CPU 71 performs image processing on the image signals input from the forward image capturing camera 76A and the rearward image capturing camera 76B to detect a space around the vehicle 1, and outputs the detected space to the navigation apparatus 2.

The laser scanner 77 is attached at the center position of the distal end portion of the vehicle 1 to scan an area around the vehicle 1, and outputs a data signal for a laser point group reflected from dynamic features such as vehicles traveling around the vehicle 1, static features such as trees, road signs, guardrails, and median strips, and so forth. The CPU 71 extracts space characteristic points from the laser point group input from the laser scanner 77, recognizes the static features such as guardrails and median strips, and controls drive of the engine device, the brake device, the electric power steering system, and so forth (not illustrated) such that the vehicle 1 travels along the static features. In addition, the CPU 71 outputs recognition data on the laser point group for guardrails, median strips, and so forth to the navigation apparatus 2.

[Schematic Configuration of Navigation Apparatus]

Subsequently, a schematic configuration of the navigation apparatus 2 will be described. As illustrated in FIG. 1, the navigation apparatus 2 according to the embodiment is composed of: a current location detection processing section 11 that detects the current position of the vehicle etc.; a data storage section 12 that stores various data; the navigation control section 13 which performs various types of computation processing on the basis of input information; an operation section 14 that receives an operation from an operator; the liquid crystal display (LCD) 15 which displays information such as a map for the operator; the speaker 16 which outputs audio guidance about route guidance etc.; a communication device 17 that communicates with a road traffic information center (not illustrated), a map information distribution center (not illustrated), and so forth via a cellular network or the like; and a touch panel 18 mounted to the surface of the liquid crystal display 15.

A remote controller, a joystick, a mouse, a touch pad, or the like may be provided in place of the touch panel 18.

A vehicle speed sensor 51 is connected to the navigation control section 13. In addition, the vehicle control ECU 3 is electrically connected to the navigation control section 13 so as to be able to acquire the relative positional relationship of vehicles around the vehicle 1 ahead of the vehicle 1 with respect to the vehicle 1.

The constituent elements which compose the navigation apparatus 2 will be described below. The current location detection processing section 11 is composed of the GPS 31, a distance sensor 32, and so forth, and can detect the current position (hereinafter referred to "vehicle position") of the vehicle 1, the vehicle orientation, the travel distance, the elevation angle, and so forth. For example, the current location detection processing section 11 can detect the turning speeds for three axes using a gyro sensor, and can detect the travel direction for each of the orientation (horizontal direction) and the elevation angle.

The GPS 31 includes a reception intensity detection section 31A that detects the reception intensity of radio waves received from GPS satellites. Meanwhile, a sensor that measures the rotational speed of wheels (not illustrated) of the vehicle to detect a distance on the basis of the measured rotational speed, a sensor that measures acceleration to detect a distance by integrating the measured acceleration twice, or the like, for example, can be used as the distance sensor 32.

The communication device 17 is configured to be able to receive the latest traffic information and weather information distributed from a probe center, a road traffic information center, or the like (not illustrated) at predetermined time intervals (e.g. at intervals of five minutes). The "traffic information" includes detailed information on traffic information such as travel time for each link, road congestion information on road congestions etc., and traffic restriction information on traffic restrictions due to a road work, a construction work, or the like, for example. For the road congestion information, the detailed information includes the actual length of the congestion, the time when the congestion is expected to be resolved, and so forth. For the traffic restriction information, the detailed information includes the period of duration of the road work, the construction work, or the like, the type of the traffic restriction such as a road closure, alternate one way passage, and a lane closure, the time period of the traffic restriction, and so forth.

The data storage section 12 includes: a hard disk (not illustrated) that serves as an external storage device and a storage medium; a map information database (map information DB) 25 stored in the hard disk; a parameter database (parameter DB) 27; and a driver (not illustrated) configured to read a predetermined program etc. and write predetermined data into the hard disk.

The map information DB 25 stores navigation map information 26 for use for the navigation apparatus 2 to provide travel guidance and search for a route. In addition, the parameter DB 27 stores a confidence degree data table 28 (see FIG. 2) that stores the confidence degree which represents the accuracy of each of image recognition results from the forward image capturing camera 76A, surrounding feature recognition results from the laser scanner 77, and position detection results from the UPS 31.

The navigation map information 26 is composed of various types of information that are necessary for route guidance and map display, and composed of: newly built road information for specifying newly built roads; map display data for displaying a map; intersection data on intersections; node data on node points; link data on roads (links); search data for searching for a route; facility data on points of interest (POIs) such as shops which are a type of facilities; search data for searching for a location; and so forth, for example.

The stored node data include data on the coordinate (position) of a node set at a branch point (including an intersection, a T junction, etc.) of actual roads and set every predetermined distance in accordance with the radius of curvature etc. on the roads, the altitude of the node, the node attribute which represents whether the node corresponds to an intersection or the like, a connected link number list which is a list of link IDs which are the identification numbers of links connected to the node, an adjacent node number list which is a list of the node numbers of nodes that are adjacent to the node via a link, and so forth.

The stored link data include: for links that compose a road, data representing the link ID for specifying the link, the link length which indicates the length of the link, the coordinate position (e.g. the latitude and the longitude) of the start point and the end point of the link, the presence or absence of a median strip, the gradient of the link, the width of the road to which the link belongs, the number of lanes, the legal speed, a railroad crossing, and so forth; for corners, data representing the radius of curvature, an intersection, a T junction, the entrance to and the exit from the corner, and so forth; and for road types, data representing general roads such as national roads, prefectural roads, and narrow streets, and toll roads such as national express highways, urban expressways, ordinary toll roads, and toll bridges.

For toll roads, further, data on access roads (ramp ways) for entry to and exit from the toll road, toll gates (interchanges), a toll for each travel section, and so forth are stored. National express highways, urban expressways, motor roads, and ordinary toll roads that require a toll are called "toll roads." Meanwhile, national roads, principal regional roads, prefectural roads, municipal roads, and so forth other than the toll roads are called "general roads."

The stored search data include data for use to search for and display a route to a set destination location, and are composed of cost data for use to calculate an search cost composed of a cost for passage of a node (hereinafter referred to as "node cost") and a cost for a link that composes a road (hereinafter referred to as "link cost"), route display data for displaying a route for guidance selected through route search on the map on the liquid crystal display 15, and so forth. The link cost is data that indicate the average travel time required to pass through the link, and may be "3 (min)," for example.

The stored facility data include data such as the name, the address, the telephone number, the coordinate position (e.g. the longitude and the latitude of the center position, the entrance, the exit, etc.) on the map, and the facility icon or the landmark, which displays the position of the facility on the map, of POIs such as hotels, amusement parks, palaces, hospitals, gas stations, parking lots, stations, airports, ferry terminals, interchanges (ICs), junctions (JCTs), service areas, and parking areas (PAs) in each area, stored together with facility IDs that specify the POIs. In addition, registered facility IDs that specify registered facilities such as convenience stores and gas stations registered by a user are also stored.

The content of the map information DB 25 is updated by downloading update information distributed from the map information distribution center (not illustrated) via the communication device 17.

As illustrated in FIG. 1, the navigation control section 13 which constitutes the navigation apparatus 2 includes a CPU 41 that serves as a computation device and a control device that control the entire navigation apparatus 2, internal storage devices such as a RAM 42 for use as a working memory when the CPU 41 performs various types of computation processing and that stores route data when a route is found etc. and a ROM 43 that stores a control program, a timer 45 that measures a time, and so forth. The ROM 43 also stores a program etc. for "automated drive cancellation processing" (see FIG. 3) for controlling the vehicle 1 so as to suppress cancellation of automated drive to be discussed later or the like.

The operation section 14 is operated to correct the current position at the time of start of travel, input a departure location at which guidance is started and a destination location at which guidance is ended, make a search for information on a facility, and so forth, and composed of various types of keys and a plurality of operation switches. The navigation control section 13 performs control to execute various types of corresponding operation on the basis of a switch signal output by depressing each switch, for example.

The liquid crystal display 15 displays map information on an area in which the vehicle is currently traveling, map information on an area around the destination location, operational guidance, an operation menu, key guidance, a route for guidance from the current location to the destination location, guidance information on a travel along the route for guidance, traffic information, news, weather forecasts, the time, mails, television programs, and so forth.

The speaker 16 outputs audio guidance on a travel along the route for guidance on the basis of an instruction from the navigation control section 13. Examples of the audio guidance include "Turn right at ∘∘ intersection 200 m ahead."

The touch panel 18 is a touch switch in the form of a transparent panel mounted on the display screen of the liquid crystal display 15, and is configured such that various instruction commands can be input by depressing a button or a map displayed on the screen of the liquid crystal display 15, for example. The touch panel 18 may be constituted of a liquid crystal with an optical sensor that is operable by directly depressing the screen of the liquid crystal display 15 or the like.

An example of the confidence degree data table 28 which is stored in the parameter DB 27 will be described with reference to FIG. 2.

As illustrated in FIG. 2, the confidence degree data table 28 is composed of "vehicle position specifying method," "affecting parameter," "vehicle position confidence degree," and "coefficient."

The "vehicle position specifying method" stores "image recognition," "surrounding feature recognition," and "GPS reception" as methods for specifying the vehicle position. The "image recognition" represents a method in which image processing is performed on the image signal input from the forward image capturing camera 76A to recognize images of while lines that indicate the boundary of the travel lane through edge detection or the like to specify the vehicle position with respect to the white lines. The "surrounding feature recognition" represents a method in which space characteristic points are extracted from the laser point group input from the laser scanner 77 to specify the vehicle position with respect to static features such as guardrails and median strips. The "GPS reception" represents a method in which the coordinate position (e.g. the latitude and the longitude) is acquired using the GPS 31 to specify the vehicle position on the road from the navigation map information 26.

The "affecting parameter" stores a parameter that affects the "vehicle position confidence degree." Specifically, "how a boundary line looks," which represents how the edge of a white line is detected through image processing, is stored in correspondence with the "image recognition" of the "vehicle position specifying method." "Density and distribution status of space characteristic points," which represents the density and the distribution status of the laser point group which forms the space characteristic points, is stored in correspondence with the "surrounding feature recognition" of the "vehicle position specifying method." "GPS reception intensity," which represents the reception intensity of radio waves received from the GPS satellites, is stored in correspondence with the "GPS reception" of the "vehicle position specifying method."

The "vehicle position confidence degree" stores a value of "1" to "0.1" obtained by dividing the confidence degree, which represents the degree of recognition of the vehicle position specified through the "image recognition," the "surrounding feature recognition," and the "GPS reception" of the "vehicle position specifying method," in a predetermined number of levels, e.g. ten levels. Thus, a larger value of the vehicle position confidence degree represents a higher degree of recognition of the vehicle position, that is, a higher accuracy of the vehicle position. For example, with the "image recognition," the vehicle position confidence degree stores a value of "1" in the case where "the boundary line (white line) is not faded," that is, a continuous white line has been detected. The vehicle position confidence degree stores a value of "0.1" in the case where "the boundary line (white line) is faded," that is, a large portion of the white line has been come off.

With the "surrounding feature recognition," the vehicle position confidence degree stores a value of "1" in the case where "a continuous dense point group has been acquired," that is, the density of the laser point group is high and the space characteristic points are continuous. The vehicle position confidence degree stores a value of "0.1" in the case where "the density of the point group is low, the point group is not continuous, etc.," that is, the density of the laser point group is low and the space characteristic points are not continuous. With the "GPS reception," meanwhile, the vehicle position confidence degree stores a value of "1" in the case where "the vehicle is not surrounded by tall buildings," that is, the reception intensity of the GPS 31 is sufficient. The vehicle position confidence degree stores a value of "0.1" in the case where "the vehicle is surrounded by tall buildings," that is, the reception intensity of the GPS 31 is not sufficient.

The "coefficient" stores coefficients A, B, and C for assigning a weight to each vehicle position confidence degree corresponding to the "image recognition," the "surrounding feature recognition," and the "GPS reception" of the "vehicle position specifying method" in calculating a "continuity rate" to be discussed later.

[Automated Drive Cancellation Processing]

Next, the "automated drive cancellation processing," which is processing executed by the CPU 41 of the navigation apparatus 2 in the vehicle 1 configured as described above to control the vehicle 1 so as to suppress cancellation of automated drive, will be described with reference to FIGS. 3 to 11. A program illustrated in the flowchart of FIG. 3 is processing executed at intervals of a predetermined time, e.g. at intervals of 0.1 second, while automated drive is continued in the case where a signal indicating that automated drive has been started is input from the vehicle control ECU 3. In the case where the automated drive start button 61 is depressed on a toll road, the vehicle control ECU 3 starts automated drive, and thereafter outputs an automated drive start signal indicating that automated drive has been started to the navigation apparatus 2.

As illustrated in FIG. 3, first, in step (hereinafter abbreviated as "S") 11, the CPU 41 of the navigation apparatus 2 requests the vehicle control ECU 3 to output image recognition data on white lines and recognition data on a laser point group for guardrails, median strips, and so forth. Consequently, the CPU 71 of the vehicle control ECU 3 outputs image recognition data on white lines and recognition data on a laser point group for guardrails, median strips, and so forth to the navigation apparatus 2.

The CPU 41 stores the image recognition data on white lines and the recognition data on a laser point group for guardrails, median strips, and so forth input from the vehicle control ECU 3 in the RAM 42. In addition, the CPU 41 requests the GPS 31 to output the reception intensity of radio waves received from GPS satellites detected by the reception intensity detection section 31A, Then, the CPU 41 stores the reception intensity of radio waves input from the GPS 31 in the RAM 42 as "GPS reception intensity."

Subsequently, the CPU 41 reads the image recognition data on white lines from the RAM 42, reads a vehicle position confidence degree (hereinafter referred to as "image recognition confidence degree") corresponding to the image recognition data on white lines from the confidence degree data table 28, and stores the read confidence degree in the RAM 42 as "image recognition confidence degree" which represents the degree of recognition of boundary lines (white lines). In addition, the CPU 41 reads the recognition data on a laser point group for guardrails, median strips, and so forth from the RAM 42, reads a vehicle position confidence degree (hereinafter referred to as "feature recognition confidence degree") corresponding to the recognition data on a laser point group from the confidence degree data table 28, and stores the read confidence degree in the RAM 42 as "feature recognition confidence degree" which represents the degree of recognition of features.

In addition, the CPU 41 reads the GPS reception intensity from the RAM 42, reads a vehicle position confidence degree (hereinafter referred to as "GPS confidence degree") corresponding to the GPS reception intensity from the confidence degree data table 28, and stores the read confidence degree in the RAM 42 as "GPS confidence degree" which represents the degree of GPS reception.

Subsequently, the CPU 41 reads the "image recognition confidence degree," the "feature recognition confidence degree," and the "GPS confidence degree" from the RAM 42, and reads the coefficients A, B, and C from the confidence degree data table 28. Then, the CPU 41 calculates a "continuity rate," which is an index that indicates how accurately the vehicle position on the road can be detected through the image recognition by the forward image capturing camera 76A, through the surrounding feature recognition by the laser scanner 77, and by the GPS 31, using the following formula (1), and stores the calculated "continuity rate" in the RAM 42. Thus, the "continuity rate" represents the degree to which automated drive can be continued.

Continuity rate=image recognition confidence degree×$A$+feature recognition confidence degree×$B$+GPS confidence degree×$C$  (1)

Subsequently, in S12, the CPU 41 reads a maximum continuity rate α (hereinafter referred to as "continuity threshold α"), at which it is necessary to cancel automated drive and switch to manual drive by the driver, from the parameter DB 27, and executes determination processing in which it is determined whether or not the "continuity rate" calculated using the formula (1) is equal to or less than the continuity threshold α. The continuity threshold α is stored in advance in the parameter DB 27. Then, in the case where it is determined that the "continuity rate" is greater than the continuity threshold α (S12: NO), the CPU 41 proceeds to the processing in S13.

In S13, the CPU 41 reads a count value D1 of a distance counter that counts an accumulated travel distance from the RAM 42, substitutes "0" into the count value D1, stores the count value D1 in the RAM 42 again, and thereafter ends the processing. When the navigation apparatus 2 is started, "0" is substituted into the count value D1 of the distance counter, and the count value D1 is stored in the RAM 42.

In the case where it is determined that the "continuity rate" is equal to or less than the continuity threshold α (S12: YES), on the other hand, the CPU 41 proceeds to the processing in S14, In S14, the CPU 41 detects the travel distance via the distance sensor 32 for a predetermined time, e.g. 0.5 seconds, and adds the detected travel distance to the count value D1 of the distance counter.

Subsequently, in S15, the CPU 41 reads the count value D1 of the distance counter from the RAM 42, and executes determination processing in which it is determined whether or not the count value D1 is greater than a predetermined first travel distance, e.g. 300 m. In the case where it is determined that the count value D1 is equal to or less than 300 m (S15: NO), the CPU 41 executes the processing in and after S11 again, Thus, in the case where the continuity rate becomes greater than the continuity threshold α again before the count value D1 becomes greater than 300 m, that is, before the vehicle 1 travels over 300 m since the continuity rate becomes equal to or less than the continuity threshold α (S12: NO), the CPU 41 ends the processing, and does not cancel automated drive.

In the case where it is determined that the count value D1 is greater than 300 m (S15: YES), on the other hand, the CPU 41 substitutes "0" into the count value D1, stores the count value D1 in the RAM 42, and thereafter proceeds to the processing in S16. In S16, the CPU 41 requests the vehicle control ECU 3 to output the image recognition data on white lines and the recognition data on a laser point group for guardrails, median strips, and so forth. Then, the CPU 41 reads the "image recognition confidence degree" corresponding to the image recognition data on white lines input from the vehicle control ECU 3 from the confidence degree data table 28, and stores the read confidence degree in the RAM 42. In addition, the CPU 41 reads the "feature recognition confidence degree" corresponding to the recognition data on a laser point group for guardrails, median strips, and so forth input from the vehicle control ECU 3 from the confidence degree data table 28, and stores the read confidence degree in the RAM 42.

Figure 4:
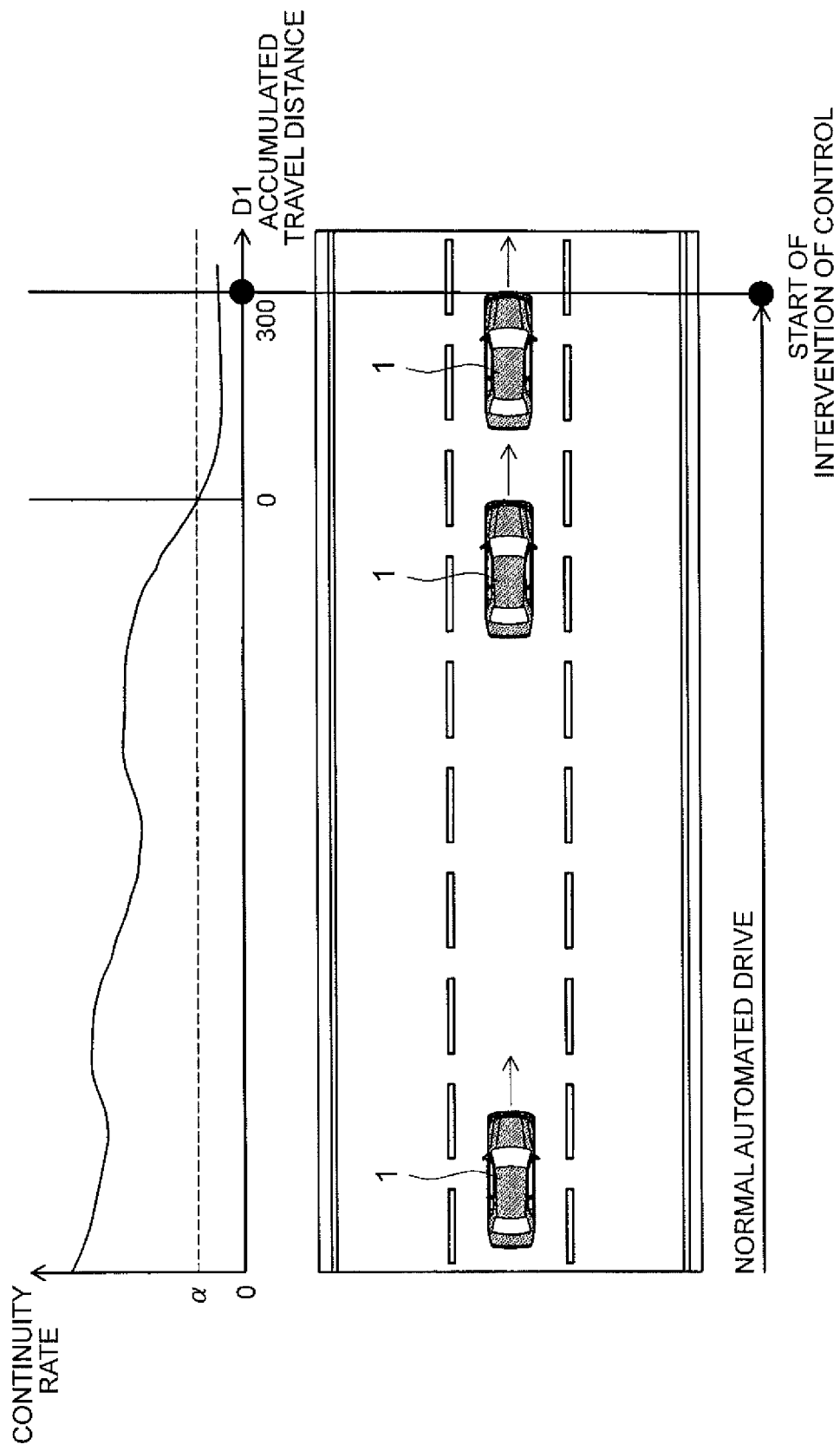
FIG. 4 illustrates an example of control since the continuity rate becomes equal to or less than a continuity threshold α until the start of intervention of control.

In addition, the CPU 41 requests the GPS 31 to output the reception intensity of radio waves received from GPS satellites detected by the reception intensity detection section 31A, Then, the CPU 41 stores the "GPS confidence degree" corresponding to the reception intensity of radio waves input from the GPS 31 in the RAM 42. After that, the CPU 41 proceeds to the processing in S17. For example, in the case where the accumulated travel distance exceeds 300 m since the continuity rate becomes equal to or less than the continuity threshold α during automated drive of the vehicle 1 as illustrated in FIG. 4, the CPU 41 of the navigation apparatus 2 which is mounted on the vehicle 1 executes the processing in and after S16.

Subsequently, in S17, the CPU 41 reads the GPS confidence degree stored in S16 from the RAM 42, and executes determination processing in which it is determined whether or not the GPS confidence degree is equal to or less than a predetermined first confidence degree, e.g. whether or not the GPS confidence degree is equal to or less than 0.3. The predetermined first confidence degree is stored in advance in the parameter DB 27, Then, in the case where it is determined that the GPS confidence degree is equal to or less than the predetermined first confidence degree, that is, in the case where it is determined that the vehicle position detected by the GPS 31 is not accurate (S17: YES), the CPU 41 proceeds to the processing in S18. In S18, the CPU 41 reads a cancellation flag from the RAM 42, sets the cancellation flag to ON, stores the flag in the RAM 42 again, and thereafter proceeds to the processing in S20.

In the case where it is determined that the GPS confidence degree is greater than the predetermined first confidence degree (S17: NO), on the other hand, the CPU 41 proceeds to the processing in S19. In S19, the CPU 41 reads a cancellation flag from the RAM 42, sets the cancellation flag to OFF, stores the flag in the RAM 42 again, and thereafter proceeds to the processing in S20. When the navigation apparatus 2 is started, the cancellation flag is set to OFF and stored in the RAM 42.

In S20, the CPU 41 reads the cancellation flag from the RAM 42, and executes determination processing in which it is determined whether or not the cancellation flag has been set to OFF. Then, in the case where it is determined that the cancellation flag has been set to ON (S20: NO), the CPU 41 proceeds to the processing in S22 to be discussed later. In the case where it is determined that the cancellation flag has been set to OFF (S20: YES), on the other hand, the CPU 41 proceeds to the processing in S21. In S21, the CPU 41 executes sub processing (see FIGS. 5 and 6) of "control intervention content determination processing," in which control information for controlling the vehicle 1 is decided such that the continuity rate becomes greater than the continuity threshold α and output to the vehicle control ECU 3, and thereafter proceeds to the processing in S22.

In S22, the CPU 41 executes sub processing (see FIG. 9) of "automated drive cancellation determination processing," in which an automated drive cancellation instruction is output to the vehicle control ECU 3 after the vehicle has traveled over a predetermined distance, and thereafter proceeds to the processing in S23. In S23, the CPU 41 reads the count value D1 of the distance counter from the RAM 42, substitutes "0" into the count value D1, and stores the count value D1 in the RAM 42 again. In addition, the CPU 41 reads the cancellation flag, a lane change flag, and a speed flag from the RAM 42, sets the respective flags to OFF, stores the flags in the RAM 42, and thereafter ends the processing.

[Control Intervention Content Determination Processing]

Next, the sub processing of the "control intervention content determination processing," which is executed by the CPU 41 in S21, will be described with reference to FIGS. 5 to 8.

Figure 5:
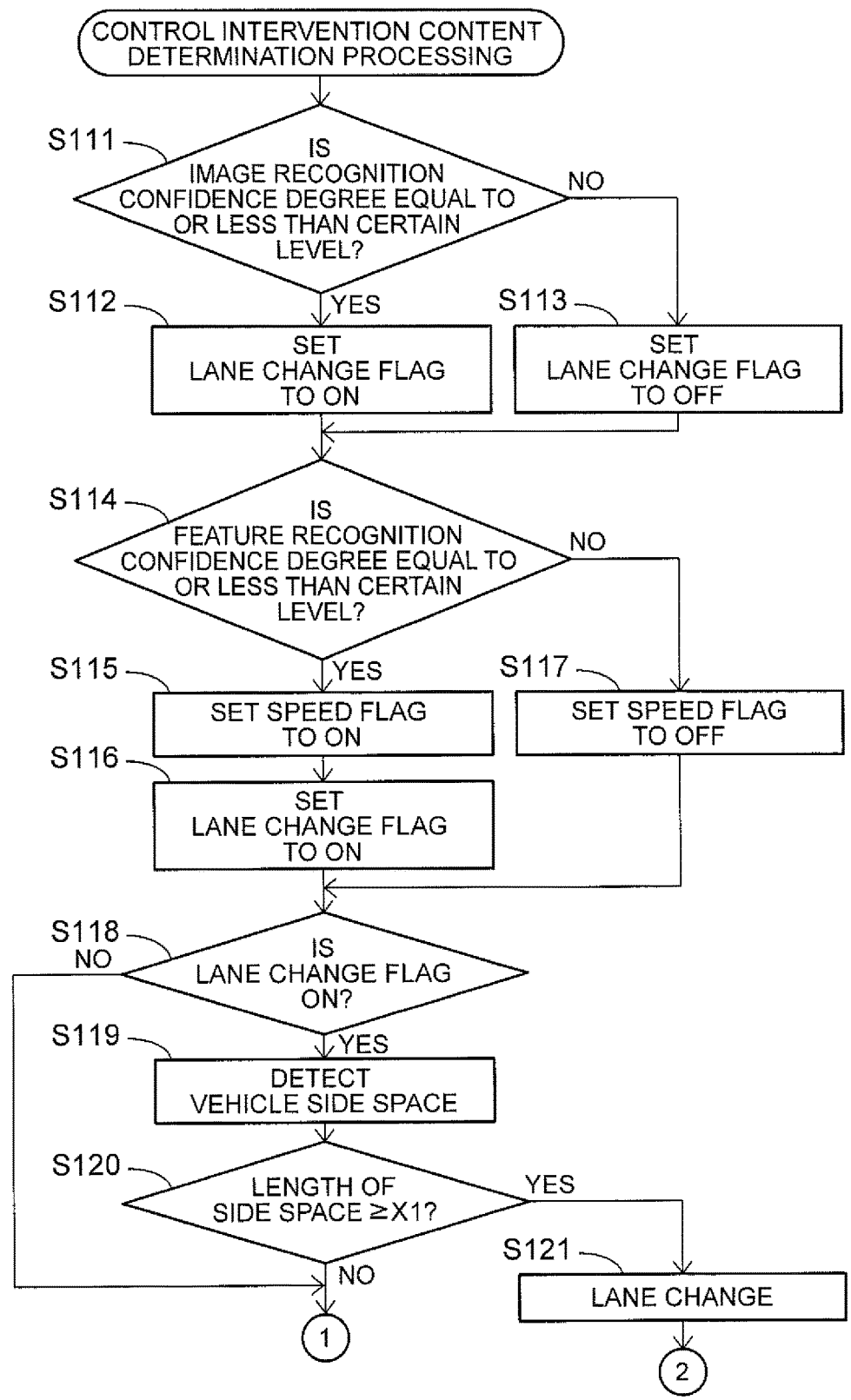
FIG. 5 is a sub flowchart illustrating sub processing of "control intervention content determination processing" of FIG. 3.

As illustrated in FIG. 5, first, in S111, the CPU 41 reads the image recognition confidence degree stored in S16 from the RAM 42, and executes determination processing in which it is determined whether or not the image recognition confidence degree is equal to or less than a predetermined second confidence degree. The predetermined second confidence degree is stored in advance in the parameter DB 27. Then, in the case where it is determined that the image recognition confidence degree is equal to or less than the predetermined second confidence degree, that is, in the case where it is determined that the white line is faded (S111: YES), the CPU 41 proceeds to the processing in S112. In S112, the CPU 41 reads the lane change flag from the RAM 42, sets the lane change flag to ON, stores the flag in the RAM 42 again, and thereafter proceeds to the processing in S114.

In the case where it is determined that the image recognition confidence degree is greater than the predetermined second confidence degree, that is, in the case where it is determined that the white line is not faded (S111: NO), on the other hand, the CPU 41 proceeds to the processing in S113. In S113, the CPU 41 reads the lane change flag from the RAM 42, sets the lane change flag to OFF, stores the flag in the RAM 42 again, and thereafter proceeds to the processing in S114. When the navigation apparatus 2 is started, the lane change flag is set to OFF and stored in the RAM 42.

In S114, the CPU 41 reads the feature recognition confidence degree stored in S16 from the RAM 42, and executes determination processing in which it is determined whether or not the feature recognition confidence degree is equal to or less than a predetermined third confidence degree. The predetermined third confidence degree is stored in advance in the parameter DB 27. Then, in the case where it is determined that the feature recognition confidence degree is equal to or less than the predetermined third confidence degree, that is, in the case where it is determined that the laser point group for surrounding features such as guardrails is not continuous (S114: YES), the CPU 41 proceeds to the processing in S115. In S115, the CPU 41 reads the speed flag from the RAM 42, sets the speed flag to ON, and stores the flag in the RAM 42 again. Subsequently, in S116, the CPU 41 reads the lane change flag from the RAM 42, sets the lane change flag to ON, stores the flag in the RAM 42 again, and thereafter proceeds to the processing in S118.

In the case where it is determined that the feature recognition confidence degree is greater than the predetermined third confidence degree, that is, in the case where it is determined that the laser point group for surrounding features such as guardrails is continuous (S114: NO), the CPU 41 proceeds to the processing in S117. In S117, the CPU 41 reads the speed flag from the RAM 42, sets the speed flag to OFF, stores the flag in the RAM 42 again, and thereafter proceeds to the processing in S118. When the navigation apparatus 2 is started, the speed flag is set to OFF and stored in the RAM 42.

In S118, the CPU 41 reads the lane change flag from the RAM 42, and executes determination processing in which it is determined whether or not the lane change flag has been set to ON. Then, in the case where it is determined that the lane change flag has been set to OFF (S118: NO), the CPU 41 proceeds to the processing in S122.

In the case where it is determined that the lane change flag has been set to ON (S118: YES), on the other hand, the CPU 41 proceeds to the processing in S119. In S119, the CPU 41 requests the vehicle control ECU 3 to measure a space from ahead of the vehicle to behind the vehicle in the left and right side lanes. Consequently, the CPU 71 of the vehicle control ECU 3 measures lengths L1 and L2 of side spaces from ahead of the vehicle to behind the vehicle in the left and right side lanes by performing image processing on image data captured by the forward image capturing camera 76A and image data captured by the rearward image capturing camera 76B, and outputs the measured lengths L1 and L2 to the navigation apparatus 2.

The CPU 41 stores the lengths L1 and L2 of the side spaces from ahead of the vehicle to behind the vehicle input from the vehicle control ECU 3 in the RAM 42, and thereafter proceeds to the processing in S120. In S120, the CPU 41 executes determination processing in which it is determined whether or not the lengths L1 and L2 of the side spaces in the left and right side lanes are equal to or more than X1 (m), which enables a safe lane change, e.g. by reading the legal speed of the link along which the vehicle is currently traveling from the navigation map information 26 and determining whether or not the lengths L1 and L2 are equal to or more than a distance over which the vehicle travels in 12 seconds at the legal speed. That is, the CPU 41 executes determination processing in which it is determined whether or not a side space that allows a safe lane change is present in the left and right side lanes.

Figure 6:
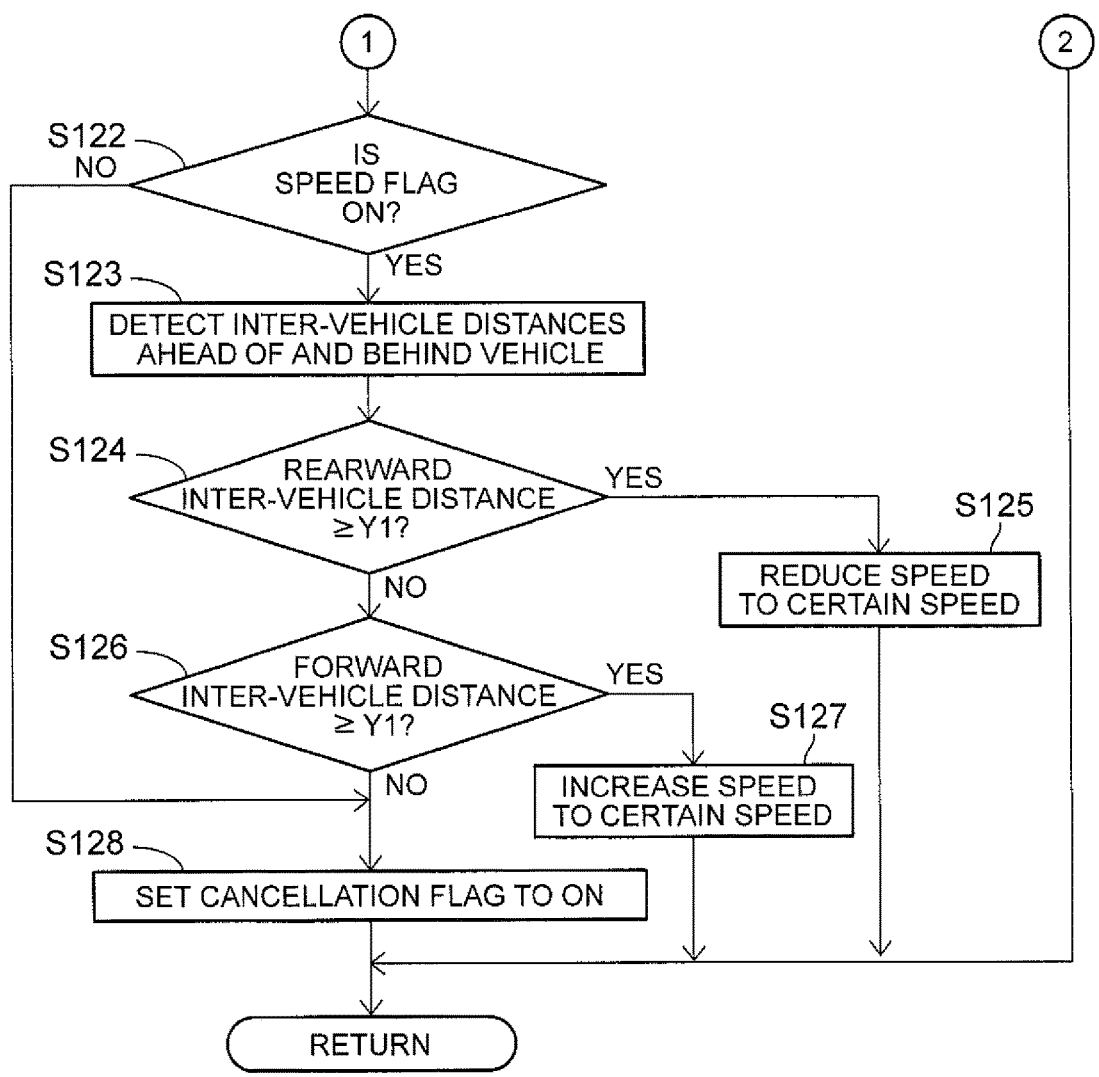
FIG. 6 is a sub flowchart illustrating the sub processing of the "control intervention content determination processing" of FIG. 3.

In the case where it is determined that at least one of the lengths L1 and L2 of the side spaces in the left and right side lanes is equal to or more than X1 (m), which enables a safe lane change (S120: YES), the CPU 41 proceeds to the processing in S121. In S121, the CPU 41 outputs, to the vehicle control ECU 3, a "lane change instruction" for a lane change to a side lane with a side space of equal to or more than X1 (m), which enables a safe lane change, among the side spaces from ahead of the vehicle to behind the vehicle. After that, as illustrated in FIG. 6, the CPU 41 ends the sub processing, returns to the main flowchart, and proceeds to the processing in S22.

Consequently, the CPU 71 of the vehicle control ECU 3 makes a lane change to a side lane with a side space of equal to or more than X1 (m), which enables a safe lane change, among the side spaces from ahead of the vehicle to behind the vehicle, through automated drive by controlling drive of the engine device, the brake device, the electric power steering system, and so forth (not illustrated) in accordance with the "lane change instruction" input from the navigation apparatus 2. In the case where a side space of equal to or more than X1 (m), which enables a safe lane change, is present in both the left and right side lanes, the CPU 41 outputs, to the vehicle control ECU 3, a "lane change instruction" for a lane change to a side lane on the outer side, in the left-right direction, with respect to the center line.

Figure 7:
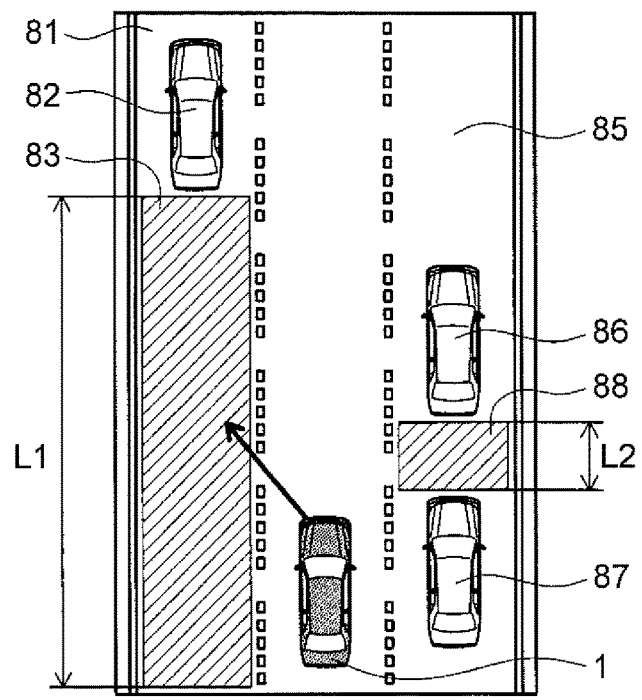
FIG. 7 illustrates an example of the control intervention content for a case where the confidence degree of image recognition is equal to or less than a certain value.

For example, as illustrated in FIG. 7, the CPU 41 determines that a side space 83 of a length L1 (m) that is equal to or more than X1 (m), which enables a safe lane change, is present behind a vehicle 82 that travels in a left-side lane 81 ahead of the vehicle, and determines that a side space 88 of a length L2 (m) that is less than X1 (m) is present behind a vehicle 86 that travels in a right-side lane 85 ahead of the vehicle between the vehicle 86 and a vehicle 87.

The CPU 41 outputs, to the vehicle control ECU 3, a "lane change instruction" for a lane change to the left-side lane 81 with the side space 83 of equal to or more than X1 (m), which enables a safe lane change. Consequently, the CPU 71 of the vehicle control ECU 3 makes a lane change to a space behind the vehicle 82 which travels in the left-side lane 81 through automated drive by controlling drive of the engine device, the brake device, the electric power steering system, and so forth (not illustrated) in accordance with the "lane change instruction" input from the navigation apparatus 2.

As illustrated in FIGS. 5 and 6, in the case where it is determined that the lengths L1 and L2 of the side spaces in both the left and right side lanes are less than X1 (m), which enables a safe lane change (S120: NO), on the other hand, the CPU 41 determines that there is no side space that enables a safe lane change in any of the left and right side lanes, and proceeds to the processing in S122. In S122, the CPU 41 reads the speed flag, and executes determination processing in which it is determined whether or not the speed flag has been set to ON. Then, in the case where it is determined that the speed flag has been set to OFF (S122: NO), the CPU 41 proceeds to the processing in S128.

In the case where it is determined that the speed flag has been set to ON (S122: YES), on the other hand, the CPU 41 proceeds to the processing in S123. In S123, the CPU 41 requests the vehicle control ECU 3 to measure inter-vehicle distances ahead of and behind the vehicle 1. Consequently, the CPU 71 of the vehicle control ECU 3 measures inter-vehicle distances M1 and M2 ahead of and behind the vehicle 1 by performing image processing on the image data captured by the forward image capturing camera 76A and the image data captured by the rearward image capturing camera 76B, and outputs the measured lengths M1 and M2 to the navigation apparatus 2.

The CPU 41 stores the inter-vehicle distances M1 and M2 ahead of and behind the vehicle 1 input from the vehicle control ECU 3 in the RAM 42, and thereafter proceeds to the processing in S124. In S124, the CPU 41 executes determination processing in which it is determined whether or not the rearward inter-vehicle distance M2 is equal to or more than an inter-vehicle distance Y1 (m) that allows the inter-vehicle distance from another vehicle ahead of the vehicle to be increased to an inter-vehicle distance that is several times, e.g. four times, a safe inter-vehicle distance M3 (m) by decreasing the vehicle speed of the vehicle 1 to a certain speed, e.g. a speed that is 90% of the legal speed. For example, the CPU 41 reads the legal speed of the link along which the vehicle 1 is currently traveling from the navigation map information 26, and determines the distance over which the vehicle 1 travels in 12 seconds at the legal speed as the inter-vehicle distance Y1 (m). In addition, the CPU 41 determines the distance over which the vehicle travels in three seconds at the legal speed as the safe inter-vehicle distance M3 (m).

In the case where it is determined that the rearward inter-vehicle distance M2 is equal to or more than the inter-vehicle distance Y1 (m) which allows the inter-vehicle distance from the other vehicle ahead of the vehicle to be increased to an inter-vehicle distance that is several times the safe inter-vehicle distance M3 (m) (S124: YES), the CPU 41 proceeds to the processing in S125. In S125, the CPU 41 outputs, to the vehicle control ECU 3, a "forward inter-vehicle distance change instruction" for instructing the vehicle control ECU 3 to increase the inter-vehicle distance from the other vehicle ahead of the vehicle to an inter-vehicle distance that is several times, e.g. four times, the safe inter-vehicle distance M3 (m) by decreasing the vehicle speed of the vehicle 1 to a certain speed, e.g. a speed that is 90% of the legal speed, After that, the CPU 41 ends the sub processing, returns to the main flowchart, and proceeds to the processing in S22.

Consequently, the CPU 71 of the vehicle control ECU 3 increases the inter-vehicle distance from the other vehicle ahead of the vehicle to an inter-vehicle distance that is several times the safe inter-vehicle distance M3 (m) by decreasing the vehicle speed of the vehicle 1 to a certain speed by controlling drive of the engine device, the brake device, the electric power steering system, and so forth (not illustrated) in accordance with the "forward inter-vehicle distance change instruction" input from the navigation apparatus 2.

Figure 8:
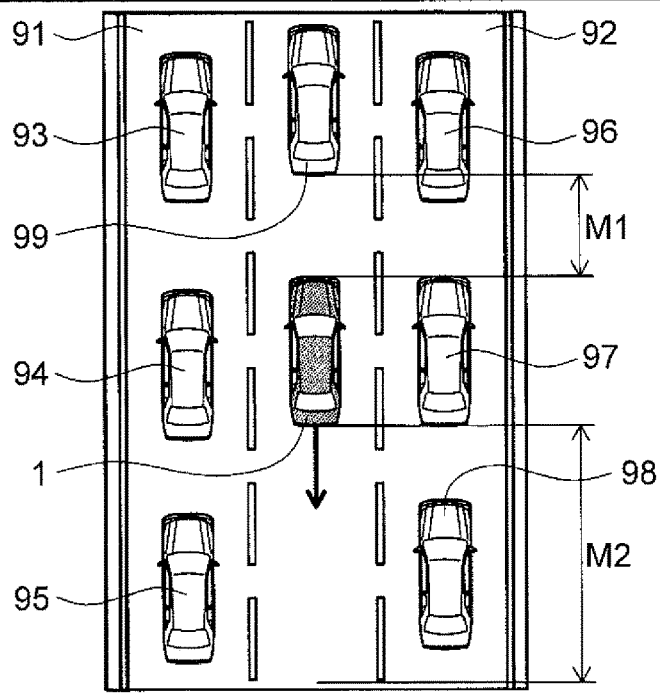
FIG. 8 illustrates an example of the control intervention content for a case where the confidence degree of surrounding feature recognition is equal to or less than a certain value.

For example, as illustrated in FIG. 8, vehicles 93 to 98 are present in a left-side lane 91 and a right-side lane 92 on the left and right sides of the vehicle 1, there is no side space that enables a safe lane change in any of the lanes 91 and 92, a vehicle 99 is present ahead of the vehicle, and the feature recognition confidence degree is equal to or less than the predetermined third confidence degree. In addition, the inter-vehicle distance M1 between the vehicle 99 ahead of the vehicle and the vehicle 1 is generally equal to the safe inter-vehicle distance M3 (m).

In this case, when it is determined that the rearward inter-vehicle distance M2 is equal to or more than the inter-vehicle distance Y1 (m) which allows the inter-vehicle distance from the other vehicle ahead of the vehicle to be increased to an inter-vehicle distance that is four times the safe inter-vehicle distance M3 (m) by decreasing the vehicle speed of the vehicle 1 to a speed that is 90% of the legal speed, the CPU 41 outputs, to the vehicle control ECU 3, a "forward inter-vehicle distance change instruction" for instructing the vehicle control ECU 3 to increase the inter-vehicle distance from the other vehicle ahead of the vehicle to an inter-vehicle distance that is four times the safe inter-vehicle distance M3 (m) by decreasing the vehicle speed of the vehicle 1 to a speed that is 90% of the legal speed.

Consequently, the CPU 71 of the vehicle control ECU 3 increases the inter-vehicle distance from the vehicle 99 ahead of the vehicle to an inter-vehicle distance that is four times the safe inter-vehicle distance M3 (m) by decreasing the vehicle speed of the vehicle 1 to a certain speed by controlling drive of the engine device, the brake device, the electric power steering system, and so forth (not illustrated) in accordance with the "forward inter-vehicle distance change instruction" input from the navigation apparatus 2. As a result, the vehicle 1 can travel behind the vehicles 93 to 98 which are present on both the left and right sides of the vehicle 1, which makes it possible to enhance the feature recognition confidence degree acquired via the laser scanner 77 to increase the continuity rate to be greater than the continuity threshold α.

As illustrated in FIG. 6, in the case where it is determined that the rearward inter-vehicle distance M2 is less than the inter-vehicle distance Y1 (m) which allows the inter-vehicle distance from the other vehicle ahead of the vehicle to be increased to an inter-vehicle distance that is several times the safe inter-vehicle distance M3 (m) (S124: NO), on the other hand, the CPU 41 proceeds to the processing in S126. In S126, the CPU 41 executes determination processing in which it is determined whether or not the forward inter-vehicle distance M1 is equal to or more than the inter-vehicle distance Y1 (m) which allows the inter-vehicle distance from another vehicle behind the vehicle to be increased to an inter-vehicle distance that is several times, e.g. four times, the safe inter-vehicle distance M3 (m) by increasing the vehicle speed of the vehicle 1 to a certain speed, e.g. the legal speed of the link along which the vehicle is currently traveling.

In the case where it is determined that the forward inter-vehicle distance M1 is equal to or more than the inter-vehicle distance Y1 (m) which allows the inter-vehicle distance from the other vehicle behind the vehicle to be increased to an inter-vehicle distance that is several times the safe inter-vehicle distance M3 (m) (S126: YES), the CPU 41 proceeds to the processing in S127. In S127, the CPU 41 outputs, to the vehicle control ECU 3, a "rearward inter-vehicle distance change instruction" for instructing the vehicle control ECU 3 to increase the inter-vehicle distance from the other vehicle behind the vehicle to an inter-vehicle distance that is several times, e.g. four times, the safe inter-vehicle distance M3 (m) by increasing the vehicle speed of the vehicle 1 to a certain speed, e.g. the legal speed. After that, the CPU 41 ends the sub processing, returns to the main flowchart, and proceeds to the processing in S22.

Consequently, the CPU 71 of the vehicle control ECU 3 increases the inter-vehicle distance from the other vehicle behind the vehicle to an inter-vehicle distance that is several times the safe inter-vehicle distance M3 (m) by increasing the vehicle speed of the vehicle 1 to a certain speed by controlling drive of the engine device, the brake device, the electric power steering system, and so forth (not illustrated) in accordance with the "rearward inter-vehicle distance change instruction" input from the navigation apparatus 2.

In the case where it is determined that the forward inter-vehicle distance M1 is less than the inter-vehicle distance Y1 (m) which allows the inter-vehicle distance from the other vehicle behind the vehicle to be increased to an inter-vehicle distance that is several times the safe inter-vehicle distance M3 (m) (S126: NO), on the other hand, the CPU 41 proceeds to the processing in S128. In S128, the CPU 41 reads the cancellation flag from the RAM 42, sets the cancellation flag to ON, and stores the flag in the RAM 42 again. After that, the CPU 41 ends the sub processing, returns to the main flowchart, and proceeds to the processing in S22.

[Automated Drive Cancellation Determination Processing

Next, the sub processing of the "automated drive cancellation determination processing," which is executed by the CPU 41 in S22, will be described with reference to FIGS. 9 and 10.

Figure 9:
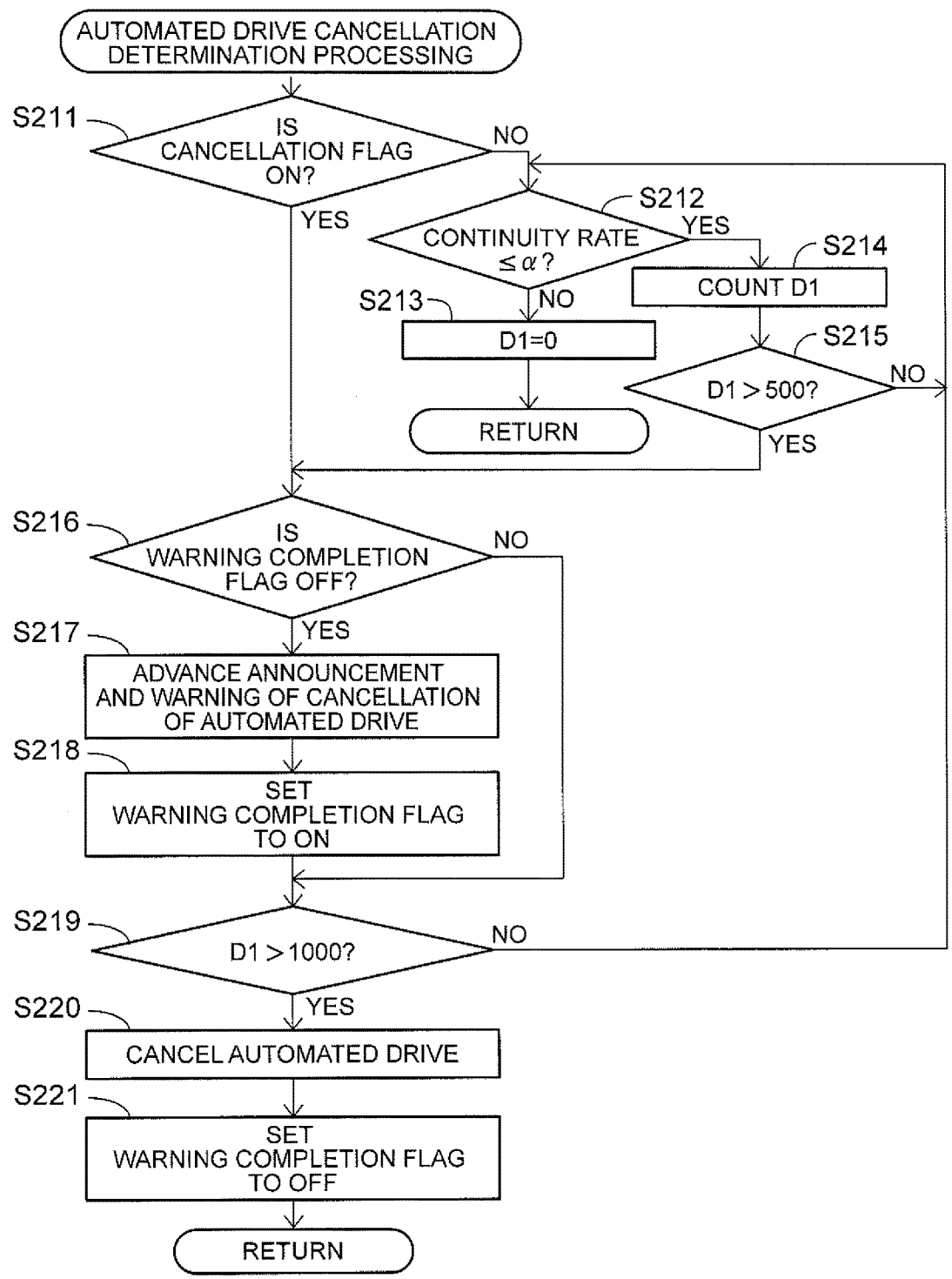
FIG. 9 is a sub flowchart illustrating sub processing of "automated drive cancellation determination processing" of FIG. 3.

As illustrated in FIG. 9, first, in S211, the CPU 41 reads the cancellation flag from the RAM 42, and executes determination processing in which it is determined whether or not the cancellation flag has been set to ON. Then, in the case where it is determined that the cancellation flag has been set to OFF (S211: NO), the CPU 41 proceeds to the processing in S212.

In S212, the CPU 41 requests the vehicle control ECU 3 to output the image recognition data on white lines and the recognition data on a laser point group for guardrails, median strips, and so forth. Consequently, the CPU 71 of the vehicle control ECU 3 outputs image recognition data on white lines and recognition data on a laser point group for guardrails, median strips, and so forth to the navigation apparatus 2. The CPU 41 stores the image recognition data on white lines and the recognition data on a laser point group for guardrails, median strips, and so forth input from the vehicle control ECU 3 in the RAM 42. In addition, the CPU 41 requests the GPS 31 to output the reception intensity of radio waves received from GPS satellites detected by the reception intensity detection section 31A. Then, the CPU 41 stores the reception intensity of radio waves input from the GPS 31 in the RAM 42 as "GPS reception intensity."

Subsequently, the CPU 41 reads the image recognition data on white lines from the RAM 42, reads an image recognition confidence degree corresponding to the image recognition data on white lines from the confidence degree data table 28, and stores the read confidence degree in the RAM 42. In addition, the CPU 41 reads the recognition data on a laser point group for guardrails, median strips, and so forth, reads a feature recognition confidence degree corresponding to the recognition data on a laser point group from the confidence degree data table 28, and stores the read confidence degree in the RAM 42. In addition, the CPU 41 reads the GPS reception intensity from the RAM 42, reads a GPS confidence degree corresponding to the GPS reception intensity from the confidence degree data table 28, and stores the read confidence degree in the RAM 42.

Subsequently, the CPU 41 reads the "image recognition confidence degree," the "feature recognition confidence degree," and the "GPS confidence degree" from the RAM 42, and reads the coefficients A, B, and C from the confidence degree data table 28. Then, the CPU 41 calculates a "continuity rate" using the formula (1), and stores the calculated "continuity rate" in the RAM 42. Next, the CPU 41 reads the continuity threshold α from the parameter DB 27, and executes determination processing in which it is determined whether or not the "continuity rate" calculated using the formula (1) is equal to or less than the continuity threshold α.

Then, in the case where it is determined that the "continuity rate" is greater than the continuity threshold α (S212: NO), the CPU 41 proceeds to the processing in S213. In S213, the CPU 41 reads a count value D1 of the distance counter which counts an accumulated travel distance from the RAM 42, substitutes "0" into the count value D1, and stores the count value D1 in the RAM 42 again. After that, the CPU 41 ends the sub processing, returns to the main flowchart, and proceeds to the processing in S23.

In the case where it is determined that the "continuity rate" is equal to or less than the continuity threshold α (S212: YES), on the other hand, the CPU 41 proceeds to the processing in S214. In S214, the CPU 41 detects the travel distance via the distance sensor 32 for a predetermined time, e.g. 0.5 seconds, and adds the detected travel distance to the count value D1 of the distance counter.

Subsequently, in S215, the CPU 41 reads the count value D1 of the distance counter from the RAM 42, and executes determination processing in which it is determined whether or not the count value D1 is greater than a predetermined second travel distance, e.g. 500 m. In the case where it is determined that the count value D1 is equal to or less than 500 m (S215: NO), the CPU 41 executes the processing in and after S212 again. Thus, in the case where the continuity rate becomes greater than the continuity threshold α again before the count value D1 becomes greater than 500 m, that is, before the vehicle 1 travels over 500 m since the CPU 41 performed the sub processing of the "control intervention content determination processing" in S21 (S212: NO), the CPU 41 ends the sub processing, returns to the main flowchart, and does not cancel automated drive.

In the case where it is determined that the count value D1 is greater than 500 m (S215: YES), on the other hand, the CPU 41 proceeds to the processing in S216. In S216, the CPU 41 reads the warning completion flag from the RAM 42, and executes determination processing in which it is determined whether or not the warning completion flag has been set to OFF. Then, in the case where it is determined that the warning completion flag has been set to ON (S216: NO), the CPU 41 proceeds to the processing in S219. When the navigation apparatus 2 is started, the warning completion flag is set to OFF and stored in the RAM 42.

In the case where it is determined that the warning completion flag has been set to OFF (S216: YES), on the other hand, the CPU 41 proceeds to the processing in S217. In S217, the CPU 41 announces in advance cancellation of automated drive using audio via the speaker 16, and warns the driver to prepare for manual drive. For example, the CPU 41 provides audio guidance that says "Automated drive will be canceled soon. Please prepare for manual drive," via the speaker 16.

For example, as illustrated in FIG. 10, the vehicle has traveled over a distance F1 (m) since the CPU 41 determines that the cancellation flag has been set to OFF (start of intervention of control) in S20 until a lane change to a left-side lane 101 on the left side of the vehicle 1 is completed through automated drive (completion of intervention of control) in S121. After that, the "continuity rate" is equal to or less than the continuity threshold α while the vehicle 1 is traveling in the left-side lane 101 through automated drive until the predetermined second travel distance, e.g. 500 m, is reached. Therefore, when the travel distance after the completion of intervention of control has reached 500 m, the CPU 41 announces in advance cancellation of automated drive using audio via the speaker 16, and warns the driver to prepare for manual drive.

Subsequently, as illustrated in FIG. 9, in S218, the CPU 41 reads the warning completion flag from the RAM 42, sets the warning completion flag to ON, stores the flag in the RAM 42 again, and thereafter proceeds to the process in S219. In S219, the CPU 41 reads the count value D1 of the distance counter from the RAM 42, and executes determination processing in which it is determined whether or not the count value D1 is greater than a predetermined third travel distance, e.g. 1000 m.

In the case where it is determined that the count value D1 is equal to or less than 1000 m (S219: NO), the CPU 41 executes the processing in and after S212 again. Thus, in the case where the continuity rate becomes greater than the continuity threshold α again before the count value D1 becomes greater than 1000 m, that is, before the vehicle 1 travels over 1000 m since the CPU 41 performed the sub processing of the "control intervention content determination processing" in S21 (S212: NO), the CPU 41 ends the sub processing, returns to the main flowchart, and does not cancel automated drive.

In the case where it is determined that the count value D1 is greater than 1000 m (S219: YES), on the other hand, the CPU 41 proceeds to the processing in S220. In S220, the CPU 41 informs the driver that automated drive will be canceled through audio via the speaker 16. For example, the CPU 41 provides audio guidance that says "Automated drive will be canceled in five seconds." via the speaker 16. At the same time, the CPU 41 outputs an "automated drive cancellation instruction" for instructing the vehicle control ECU 3 to cancel automated drive and switch to manual drive by the driver. Consequently, the CPU 71 of the vehicle control ECU 3 cancels automated drive and switches to manual drive by the driver five seconds after the "automated drive cancellation instruction" is input.

For example, as illustrated in FIG. 10, the CPU 41 informs the driver that automated drive will be canceled through audio via the speaker 16 when the travel distance after the completion of intervention of control has reached 1000 m. At the same time, in addition, the CPU 41 outputs an "automated drive cancellation instruction" to the vehicle control ECU 3. As a result, the CPU 71 of the vehicle control ECU 3 cancels automated drive, and switches to manual drive by the driver.

As illustrated in FIG. 9, in S221, the CPU 41 reads the warning completion flag from the RAM 42, sets the warning completion flag to OFF, and stores the flag in the RAM 42 again. After that, the CPU 41 ends the sub processing, returns to the main flowchart, and proceeds to the processing in S22.

In the vehicle 1 according to the embodiment, as has been described in detail above, the CPU 41 of the navigation apparatus 2 acquires an "image recognition confidence degree" that represents the degree of recognition of boundary lines (white lines), a "feature recognition confidence degree" that represents the feature recognition degree, and a "GPS confidence degree" that represents the degree of GPS reception, and calculates a "continuity rate," which is an index that indicates how accurately the vehicle position on the road can be detected, using the formula (1). Consequently, the CPU 41 can evaluate the degree to which automated drive can be continued in accordance with the "continuity rate."

In the case where it is determined that the "continuity rate" has become equal to or less than the continuity threshold α, that is, in the case where it is determined that automated drive cannot be continued any more, the CPU 41 evaluates the "continuity rate" again until the vehicle travels over the predetermined first travel distance, e.g. 300 m. Consequently, in the case where it is determined that the "continuity rate" is greater than the continuity threshold α again, automated drive can be continued without being canceled, and the CPU 41 can control the vehicle 1 so as to suppress cancellation of automated drive.

In the case where it is determined that the "continuity rate" is continuously equal to or less than the continuity threshold α since the "continuity rate" becomes equal to or less than the continuity threshold α until the vehicle travels over the predetermined first travel distance, on the other hand, the CPU 41 outputs, to the vehicle control ECU 3, a "lane change instruction" for a lane change to a side lane if the image recognition confidence degree is equal to or less than the predetermined second confidence degree and there is a side space that enables a lane change in the side lane. Consequently, the CPU 41 can change the travel position of the vehicle 1 to a side lane and detect white lines for the side lane via the forward image capturing camera 76A, which can enhance the image recognition confidence degree.

In the case where it is determined that the "continuity rate" is continuously equal to or less than the continuity threshold α since the "continuity rate" becomes equal to or less than the continuity threshold α until the vehicle travels over the predetermined first travel distance, in addition, the CPU 41 outputs, to the vehicle control ECU 3, a "forward inter-vehicle distance change instruction" for instructing the vehicle control ECU 3 to increase the inter-vehicle distance ahead of the vehicle by decreasing the vehicle speed of the vehicle 1 to a certain speed if the feature recognition confidence degree is equal to or less than the predetermined third confidence degree and the inter-vehicle distance behind the vehicle is equal to or more than Y1 (m). Meanwhile, the CPU 41 outputs, to the vehicle control ECU 3, a "rearward inter-vehicle distance change instruction" for instructing the vehicle control ECU 3 to increase the inter-vehicle distance behind the vehicle by increasing the vehicle speed of the vehicle 1 to the legal speed if the inter-vehicle distance ahead of the vehicle is equal to or more than Y1 (m). Consequently, the CPU 41 can move the vehicle 1 away from other surrounding vehicles, which can enhance the feature recognition confidence degree for surrounding features via the laser scanner 77.

The CPU 41 evaluates the "continuity rate" again until the vehicle travels over the predetermined second travel distance, e.g. 500 m, after the vehicle 1 makes a lane change, the inter-vehicle distance ahead of the vehicle is increased, or the inter-vehicle distance behind the vehicle is increased. Consequently, in the case where it is determined that the "continuity rate" is greater than the continuity threshold α again, automated drive can be continued without being canceled, and the CPU 41 can control the vehicle 1 so as to suppress cancellation of automated drive.

Further, the CPU 41 announces in advance cancellation of automated drive using audio via the speaker 16 and warns the driver to prepare for manual drive in the case where it is determined that the "continuity rate" is continuously equal to or less than the continuity threshold α until the vehicle travels over the predetermined second travel distance after the vehicle 1 makes a lane change, the inter-vehicle distance ahead of the vehicle is increased, or the inter-vehicle distance behind the vehicle is increased. Then, the CPU 41 evaluates the "continuity rate" again until the predetermined third travel distance, e.g. 1000 m, is reached after cancellation of automated drive is announced in advance. Consequently, in the case where it is determined that the "continuity rate" is greater than the continuity threshold α again, automated drive can be continued without being canceled, and the CPU 41 can control the vehicle 1 so as to suppress cancellation of automated drive.

It should be understood that various improvements and modifications may be made within the scope that does not depart from the spirit of the inventive principles. In the embodiment, automated drive, which does not rely on operations by the driver, has been described as drive in which the vehicle control ECU 3 controls all the operations including an accelerator operation, a brake operation, and a steering operation, which are related to the behavior of the vehicle, among operations on the vehicle. However, automated drive, which does not rely on operations by the driver, may be drive in which the vehicle control ECU 3 controls at least one of the operations including an accelerator operation, a brake operation, and a steering operation, which are related to the behavior of the vehicle, among operations on the vehicle. On the other hand, manual drive, which relies on operations by the driver, has been described as drive in which the driver performs an accelerator operation, a brake operation, and a steering operation, which are related to the behavior of the vehicle, among operations on the vehicle. In addition, the embodiment may be modified as follows, for example.

For example, as illustrated in FIG. 11, in the case where the CPU 41 reads the cancellation flag from the RAM 42, sets the cancellation flag to ON, and stores the flag in the RAM 42 again in S128, the processing in S119 to S128 may be repeatedly performed until the vehicle travels over a certain distance F2, e.g. 300 m, without proceeding to the processing in S22.

In the case where the vehicle cannot be moved to a side lane because of vehicles 103 and 105 that travel side by side with the vehicle 1 even when the vehicle 1 has traveled over the certain distance F2, the CPU 41 may announce in advance cancellation of automated drive using audio via the speaker 16, and warn the driver to prepare for manual drive. For example, the CPU 41 may provide audio guidance that says "Automated drive will be canceled soon. Please prepare for manual drive," via the speaker 16.

Subsequently, the CPU 41 may execute the processing in S212 to S215. That is, the CPU 41 may evaluate the "continuity rate" again until the vehicle travels over the predetermined second travel distance, e.g. 500 m. Consequently, in the case where it is determined that the "continuity rate" is greater than the continuity threshold α again, automated drive can be continued without being canceled, and the CPU 41 can control the vehicle 1 so as to suppress cancellation of automated drive.

In the case where it is determined that the count value D1 is greater than 500 m (S215: YES), the CPU 41 may inform the driver that automated drive will be canceled through audio via the speaker 16. For example, the CPU 41 may provide audio guidance that says "Automated drive will be canceled in five seconds." via the speaker 16. At the same time, the CPU 41 may output an "automated drive cancellation instruction" for instructing the vehicle control ECU 3 to cancel automated drive and switch to manual drive by the driver.

Consequently, the CPU 71 of the vehicle control ECU 3 can cancel automated drive and switches to manual drive by the driver five seconds after the "automated drive cancellation instruction" is input. Thus, the CPU 41 can reduce the travel distance through automated drive with the "continuity rate" equal to or less than the continuity threshold α, which can improve the reliability of automated drive.

While an automated drive assisting device according to a specific embodiment has been described above, the automated drive assisting device may be configured as described below, and the following effect can be achieved in such cases.

For example, a first configuration is as follows.

The automated drive assisting device is characterized in that the position specifying information acquisition means acquires a plurality of pieces of the position specifying information; the control information decision means has specifying means for specifying position specifying information that lowers the continuity degree on the basis of the plurality of pieces of the position specifying information; and the control information decision means decides the vehicle control information on the basis of the position specifying information which lowers the continuity degree specified by the specifying means.

With the automated drive assisting device configured as described above, the vehicle control information can be decided on the basis of the position specifying information which lowers the continuity degree, among the plurality of pieces of the position specifying information. Therefore, vehicle control information that possibly enhances the continuity degree can be decided efficiently.

A second configuration is as follows.

The automated drive assisting device is characterized in that in the case where the position specifying information which lowers the continuity degree specified by the specifying means is static position specifying information for specifying the vehicle position on the basis of a static factor such as a lane boundary line or a static feature around the vehicle, the control information decision means decides the vehicle control information for control for changing a relative position of the vehicle with respect to the static factor, and in the case where the position specifying information which lowers the continuity degree specified by the specifying means is dynamic position specifying information for specifying the vehicle position on the basis of a dynamic factor such as another vehicle around the vehicle, the control information decision means decides the vehicle control information for control for changing a relative position of the vehicle with respect to the other vehicle.

With the automated drive assisting device configured as described above, in the case where the position specifying information which lowers the continuity degree is due to a static factor such as fading in a lane boundary line (white line) that indicates the boundary of the travel lane or a discontinuity of a static feature such as a guardrail and a median strip, it is possible to change the static position specifying information for specifying the vehicle position on the basis of a static factor such as a lane boundary line or a static feature around the vehicle so as to possibly enhance the continuity degree by deciding the vehicle control information so as to change the relative position of the vehicle with respect to the static factor. In the case where the position specifying information which lowers the continuity degree is due to a dynamic factor such as other vehicles that travel so as to surround the vehicle, meanwhile, it is possible to change the dynamic position specifying information for specifying the vehicle position on the basis of a dynamic factor such as another vehicle around the vehicle so as to possibly enhance the continuity degree by deciding the vehicle control information to control so as to change the relative position of the vehicle with respect to the other vehicle.

A third configuration is as follows.

The automated drive assisting device is characterized in that the position specifying information acquisition means has boundary line recognition means for recognizing a boundary line on a road on which the vehicle travels; the continuity degree acquisition means has boundary line recognition degree acquisition means for acquiring a boundary line recognition degree that represents a degree of recognition of the boundary line by the boundary line recognition means; the control information decision means has space detection means for detecting a space around the vehicle, and space determination means for determining whether or not there is a space that enables a lane change in a side lane beside the vehicle; and in the case where it is determined via the continuity degree determination means that automated drive cannot be continued and the boundary line recognition degree is equal to or less than a boundary line recognition threshold, the control information decision means decides, as the vehicle control information, a lane change instruction for a lane change to the side lane when it is determined via the space determination means that there is a space that enables a lane change in the side lane beside the vehicle.

With the automated drive assisting device configured as described above, a lane change instruction for a lane change to a side lane beside the vehicle can be decided as the vehicle control information, and output to the vehicle control device to cause the vehicle to make a lane change to the side lane. This makes it possible to perform control so as to possibly increase the boundary line recognition degree, to which a boundary line on the side lane is recognized, to be greater than the boundary line recognition threshold, which can suppress cancellation of automated drive.

A fourth configuration is as follows.

The automated drive assisting device is characterized in that the position specifying information acquisition means has surrounding feature recognition means for recognizing a surrounding feature on a road on which the vehicle travels; the continuity degree acquisition means has feature recognition degree acquisition means for acquiring a feature recognition degree that represents a degree of recognition of the surrounding feature by the surrounding feature recognition means; and in the case where it is determined via the continuity degree determination means that automated drive cannot be continued and the feature recognition degree is equal to or less than a feature recognition threshold, the control information decision means decides, as the vehicle control information, a lane change instruction for a lane change to the side lane when it is determined via the space determination means that there is a space that enables a lane change in the side lane beside the vehicle.

With the automated drive assisting device configured as described above, a lane change instruction for a lane change to a side lane beside the vehicle can be decided as the vehicle control information, and output to the vehicle control device to cause the vehicle to make a lane change to the side lane. This makes it possible to perform control so as to possibly increase the feature recognition degree, to which a surrounding feature on the side lane is recognized, to be greater than the feature recognition threshold, which can suppress cancellation of automated drive.

A fifth configuration is as follows.

The automated drive assisting device is characterized in that the control information decision means has inter-vehicle distance determination means for determining whether or not there is a space that enables a change in an inter-vehicle distance ahead of or behind the vehicle; and in the case where it is determined via the continuity degree determination means that automated drive cannot be continued, the feature recognition degree is equal to or less than the feature recognition threshold, and further it is determined via the space determination means that there is no space that enables a lane change in a side lane beside the vehicle, the control information decision means decides, as the vehicle control information, an inter-vehicle distance change instruction for a change in the inter-vehicle distance in a space that enables a change in the inter-vehicle distance ahead of and behind the vehicle when it is determined via the inter-vehicle distance determination means that there is a space that enables a change in the inter-vehicle distance ahead of and behind the vehicle.

With the automated drive assisting device configured as described above, an inter-vehicle distance change instruction for a change in the inter-vehicle distance in a space that enables a change in the inter-vehicle distance ahead of and behind the vehicle can be decided as the vehicle control information, and output to the vehicle control device to change the inter-vehicle distance ahead of and behind the vehicle. This makes it possible to perform control so as to possibly increase the feature recognition degree, to which a surrounding feature on the road on which the vehicle travels is recognized, to be greater than the feature recognition threshold, which can suppress cancellation of automated drive.

A sixth configuration is as follows.

The automated drive assisting device is characterized by further including travel distance acquisition means for acquiring a travel distance; and is characterized in that the control information decision means decides the vehicle control information in the case where it is determined that automated drive cannot be continued continuously until the vehicle travels over a first travel distance since it is determined via the continuity degree determination means that automated drive cannot be continued.

With the automated drive assisting device configured as described above, in the case where it is determined that automated drive can be continued on the basis of the continuity degree until the vehicle travels over the first travel distance since it is determined that automated drive cannot be continued on the basis of the continuity degree, the vehicle control information is not decided, and therefore automated drive can be continued without being canceled.

A seventh configuration is as follows.

The automated drive assisting device is characterized by further including: advance announcement means for announcing in advance cancellation of automated drive to a driver ifs the case where it is determined via the continuity degree determination means that automated drive cannot be continued until the vehicle travels over a second travel distance since the vehicle control information is output; cancellation instruction means for outputting an automated drive cancellation instruction for switching from automated drive to manual drive by the driver to the vehicle control device via the control information output means in the case where it is determined via the continuity degree determination means that automated drive cannot be continued until the vehicle travels over a third travel distance since cancellation of automated drive is announced in advance to the driver via the advance announcement means; and informing means for informing the driver of switching from automated drive to manual drive by the driver.

With the automated drive assisting device configured as described above, in the case where it is determined that automated drive can be continued on the basis of the continuity degree until the vehicle travels over the second travel distance since the vehicle control information is output, automated drive can be continued without announcing in advance cancellation of automated drive to the driver. In the case where it is determined that automated drive can be continued on the basis of the continuity degree until the vehicle travels over the third travel distance since cancellation of automated drive is announced in advance to the driver, meanwhile, automated drive can be continued without outputting an automated drive cancellation instruction, which can suppress cancellation of automated drive. Furthermore, the driver is informed that switching will be made from automated drive to manual drive again after cancellation of automated drive is announced in advance to the driver. Therefore, the driver can be reliably informed of cancellation of automated drive.

The invention claimed is:

1. An automated drive assisting device comprising:
a processor programmed to:
   acquire a plurality of pieces of position specifying information for specifying a vehicle position during travel from at least one of (i) image recognition processing on images received from a vehicle-mounted camera, (ii) surrounding feature recognition processing based on data from a vehicle-mounted laser scanner, and (iii) a GPS receiver;
   determine a continuity degree that represents a degree to which automated drive can be continued on the basis of the position specifying information acquired during the automated drive, the determined continuity degree being an index that indicates how accurately the vehicle position can be specified by using the acquired plurality of pieces of position specifying information;
   determine whether the automated drive can be continued on the basis of the continuity degree;
   specify position specifying information that lowers the continuity degree on the basis of the acquired plurality of pieces of the position specifying information;
   determine vehicle control information for controlling a vehicle on the basis of the specified position specifying information that lowers the continuity degree by:
      in the case where the position specifying information that lowers the continuity degree is static position specifying information for specifying the vehicle position on the basis of a static factor such as a lane boundary line or a static feature around the vehicle, determining the vehicle control information for control for changing a relative position of the vehicle with respect to the static factor; and
      in the case where the position specifying information that lowers the continuity degree is dynamic position specifying information for specifying the vehicle position on the basis of a dynamic factor such as another vehicle around the vehicle, determining the vehicle control information for control for changing a relative position of the vehicle with respect to the other vehicle;
   determine vehicle control information for controlling the vehicle such that the continuity degree becomes higher on the basis of the acquired plurality of pieces of the position specifying information in the case where it is determined that the automated drive cannot be continued; and
   output the determined vehicle control information to a vehicle control device that controls the vehicle.

2. The automated drive assisting device according to claim 1, wherein the processor is programmed to:
   recognize a boundary line on a road on which the vehicle travels;
   acquire a boundary line recognition degree that represents a degree of recognition of the recognized boundary line;
   detect a space around the vehicle;
   determine whether there is a space that enables a lane change in a side lane beside the vehicle; and
   in the case where it is determined that the automated drive cannot be continued and the boundary line recognition degree is equal to or less than a boundary line recognition threshold, determine, as the vehicle control information, a lane change instruction for a lane change to the side lane when it is determined that there is the space that enables the lane change in the side lane beside the vehicle.

3. The automated drive assisting device according to claim 2, wherein the processor is programmed to:
recognize a surrounding feature on a road on which the vehicle travels;
acquire a feature recognition degree that represents a degree of recognition of the surrounding feature; and
in the case where it is determined that the automated drive cannot be continued and the feature recognition degree is equal to or less than a feature recognition threshold, determine, as the vehicle control information, a lane change instruction for a lane change to the side lane when it is determined that there is the space that enables the lane change in the side lane beside the vehicle.

4. The automated drive assisting device according to claim 3, wherein the processor is programmed to:
determine whether there is a space that enables a change in an inter-vehicle distance ahead of or behind the vehicle; and
in the case where it is determined that (i) the automated drive cannot be continued, (ii) the feature recognition degree is equal to or less than the feature recognition threshold, and (iii) there is no space that enables a lane change in a side lane beside the vehicle, determine, as the vehicle control information, an inter-vehicle distance change instruction for a change in the inter-vehicle distance in a space that enables a change in the inter-vehicle distance ahead of and behind the vehicle when it is determined that there is the space that enables the change in the inter-vehicle distance ahead of and behind the vehicle.

5. The automated drive assisting device according to claim 1, wherein the processor is programmed to:
acquire a travel distance;
determine the vehicle control information in the case where it is determined that the automated drive cannot be continued continuously until the vehicle travels over a first travel distance since it is determined that the automated drive cannot be continued.

6. The automated drive assisting device according to claim 5, wherein the processor is programmed to:
announce in advance cancellation of the automated drive to a driver in the case where it is determined that the automated drive cannot be continued until the vehicle travels over a second travel distance since the vehicle control information is output;
output an automated drive cancellation instruction for switching from the automated drive to manual drive by the driver to the vehicle control device in the case where it is determined that the automated drive cannot be continued until the vehicle travels over a third travel distance since cancellation of the automated drive is announced in advance to the driver; and
inform the driver of switching from the automated drive to the manual drive by the driver.

7. An automated drive assisting method comprising:
acquiring a plurality of pieces of position specifying information that is necessary to specify a vehicle position during travel;
determining a continuity degree that represents a degree to which automated drive can be continued on the basis of the position specifying information acquired during the automated drive, the determined continuity degree being an index that indicates how accurately the vehicle position can be specified by using the acquired plurality of pieces of position specifying information;
determining whether the automated drive can be continued on the basis of the continuity degree;
determining vehicle control information for controlling a vehicle on the basis of the specified position specifying information that lowers the continuity degree by:
in the case where the position specifying information that lowers the continuity degree is static position specifying information for specifying the vehicle position on the basis of a static factor such as a lane boundary line or a static feature around the vehicle, determining the vehicle control information for control for changing a relative position of the vehicle with respect to the static factor; and
in the case where the position specifying information that lowers the continuity degree is dynamic position specifying information for specifying the vehicle position on the basis of a dynamic factor such as another vehicle around the vehicle, determining the vehicle control information for control for changing a relative position of the vehicle with respect to the other vehicle;
determining vehicle control information for controlling the vehicle such that the continuity degree becomes higher on the basis of the acquired plurality of pieces of the position specifying information in the case where it is determined that the automated drive cannot be continued; and
outputting the determined vehicle control information to a vehicle control device that controls the vehicle.

8. A computer-readable storage medium storing an automated driving assist program, the program including instructions causing a computer to perform the following functions:
acquiring a plurality of pieces of position specifying information that is necessary to specify a vehicle position during travel;
determining a continuity degree that represents a degree to which automated drive can be continued on the basis of the position specifying information acquired during the automated drive, the determined continuity degree being an index that indicates how accurately the vehicle position can be specified by using the acquired plurality of pieces of position specifying information;
determining whether the automated drive can be continued on the basis of the continuity degree;
determining vehicle control information for controlling a vehicle on the basis of the specified position specifying information that lowers the continuity degree by:
in the case where the position specifying information that lowers the continuity degree is static position specifying information for specifying the vehicle position on the basis of a static factor such as a lane boundary line or a static feature around the vehicle, determining the vehicle control information for control for changing a relative position of the vehicle with respect to the static factor; and
in the case where the position specifying information that lowers the continuity degree is dynamic position specifying information for specifying the vehicle position on the basis of a dynamic factor such as another vehicle around the vehicle, determining the vehicle control information for control for changing a relative position of the vehicle with respect to the other vehicle;

determining vehicle control information for controlling the vehicle such that the continuity degree becomes higher on the basis of the acquired plurality of pieces of the position specifying information in the case where it is determined that the automated drive cannot be continued; and outputting the determined vehicle control information to a vehicle control device that controls the vehicle.

* * * * *